(12) United States Patent
Graham

(10) Patent No.: US 7,730,019 B1
(45) Date of Patent: Jun. 1, 2010

(54) SYSTEM AND METHOD FOR DATA COLLECTION, MANAGEMENT, AND ANALYSIS

(75) Inventor: Douglas A. Graham, Mooresville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 602 days.

(21) Appl. No.: 09/703,941

(22) Filed: Nov. 1, 2000

(51) Int. Cl.
 *G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 4,468,728 | A | 8/1984 | Wang | 707/1 |
| 5,845,278 | A | 12/1998 | Kirsch et al. | 707/3 |
| 5,974,412 | A | 10/1999 | Hazlehurst et al. | 707/3 |
| 5,983,232 | A | 11/1999 | Zhang | 707/102 |
| 6,016,496 | A * | 1/2000 | Roberson | 707/103 R |
| 6,070,158 | A | 5/2000 | Kirsch et al. | 707/3 |
| 6,078,924 | A * | 6/2000 | Ainsbury et al. | 707/101 |
| 6,202,207 | B1 * | 3/2001 | Donohue | 705/59 |
| 6,609,085 | B1 * | 8/2003 | Uemura et al. | 702/189 |
| 6,745,150 | B1 * | 6/2004 | Breiman | 705/10 |

FOREIGN PATENT DOCUMENTS

JP          11096266     *  9/1999

* cited by examiner

*Primary Examiner*—Isaac M Woo
(74) *Attorney, Agent, or Firm*—Womble Carlyle Sandridge & Rice, PLLC

(57) ABSTRACT

A system, method and computer readable medium that performs data analyses, such as economic forecasting, in accordance with the configured needs of one or more users. The system may maintain local information on which its various analyses are based, and may supplement or replace this local information with information retrieved from a remote data sources containing a desired type of data, such as time series data. Preferably, the system includes the ability to search for databases within an associated information network, such as the Internet. The system records information in an index about each database it finds, including whether the database contains data of a desired type. The particular type of data sought by the system depends upon configurable settings and relates to the type of analyses for which it has been configured. Thereafter, the system may use the index to retrieve data from many different databases when performing an analysis, relieving it from the need to store such data locally. The system may use the indexed information to check remote databases for changes or updates. The system can update any affected analyses, or alert users whose analyses are affected by such changes. A variety of mathematical models may be included in the system, and it can select the best model or models for a given user problem.

103 Claims, 13 Drawing Sheets

"D"

"E"

SYSTEM AND METHOD FOR DATA COLLECTION, MANAGEMENT, AND ANALYSIS

BACKGROUND OF THE INVENTION

Information pervades modern society. Data underlies virtually every modern economic or business decision, from the administration of monetary policy to the scheduling of manufacturing production cycles. While such data is abundant, the ability to meaningfully collect, manage and analyze data relevant to a given problem remains compromised. Various circumstances conspire to limit the abilities of governments, corporations, and other organizations to effectively use available data in securing solutions for existing problems, avoiding future problems, or accurately forecasting future conditions in some arena of commerce or policy.

Although data is a pervasive commodity in the information age, it does not always make itself readily known. With the advent of information networks, such as the Internet, potential sources for data have become as disparate and wideranging as the underlying networks themselves have become. Aggregate computer networks now span the globe and each computer system within the network may or may not hold data useful for a particular analysis. Thus, locating and managing sources of data for analytical processing becomes a significant impediment to developing a data set sufficiently large or sufficiently relevant to yield meaningful analytical results in a given problem.

Even when a number of potentially useful data sources become known, understanding how best to use the data can itself present formidable challenges. For example, any number of mathematical models may be applied to a given analysis, such as a forecasting problem. However, the difference (prediction error) between real-world and modeled behaviors can be significantly different for different models. Thus, a key and potentially labor-intensive challenge becomes identifying the best model or models to use for a given analysis. Compounding this problem, only a relatively small number of data sources within a potentially large set of data sources may be statistically significant for a given analysis. Thus, attempting to develop an accurate problem analysis becomes at least a three-fold challenge of (1) identifying the largest possible set of data sources that may be relevant to the problem at hand; (2) selecting the model or models that most accurately match the real-world system the problem involves; and (3) determining which data sources are actually significant with respect to developing the most accurate analysis. Effectively meeting the above challenges often requires a significant expenditure of labor and time, and too much "guessing" on the part of those seeking the problem solution.

Yet another challenge arises from the dynamic nature of the world at large. For example, weather changes influence crop production estimates, which, in turn, influence commodity markets. Political and economic changes can have sweeping influence, such as changing consumer savings rates and spending habits, or moving the financial markets up or down. Thus, maintaining the currency of, for example, an economic forecast, represents a significant challenge. Tracking changes in every data source that might possibly be relevant to the calculated answer represents one approach, but may be impractical without sophisticated automated intelligence. A more efficient approach might be tracking changes only in data deemed significant to the calculated answer. However, this gets back to the oftentimes-difficult task of identifying which ones among disparate sets of data are significant to a given analysis. In this latter case, significant efficiency may be gained with respect to recalculating the answer in response to data changes, and in alerting those parties interested in the answer stemming from such recalculations, or about changes in data significant to their particular problem.

Accordingly, there remains a need for a data analysis system with the ability to search out disparate data sources that may be potentially useful in a given analysis or analyses. Preferably, this searching capability would permit navigating through and retrieving information from modern information networks, such as the Internet. Ideally, the needed data analysis system would retrieve data from these remote sources when needed, rather than maintaining duplicate data locally. Further, the data analysis system should be able to check for changes in the remote data so that it can update its analyses in response to changes in underlying data, or at least alert those interested in such analyses to changes in the underlying data. Finally, the needed data analysis system should have the capability to change or adapt its operation in determining a solution to a given problem such that errors in the final answer are minimized, or such that a given forecast most closely matches the actual behavior of the system being modeled.

SUMMARY OF THE INVENTION

A computer-implemented system and method, and a computer readable medium containing software, for locating remote databases containing a desired type of data by searching for a remote database accessible via a network of computer systems, determining whether the database found is contains a desired type of data, storing location information the database if it does. Alternatively, the system can store location information for remote database found during the searching, and store an indication of whether the database contains the desired type of data. In addition, the system can select a database that contains the desired type of data for use in a data analysis, retrieve the data for use in a data analysis, and store an indication that the database contains data that has been used in the data analysis. The data analysis can be an economic, demographic or meteorological forecast, which is specified by a user. The system can be further configured to determine at a predetermined time interval whether the database has changed, if so, updating the data analysis using the changed data. A user can be provided with an indication that the predetermined data analysis has been updated and/or the updated analysis itself. If the data has been used in the predetermined data analysis is time series data, and the time interval can be determined on the basis of the frequency of the time series data.

A user can select a local database containing the desired type of data, retrieve data from the selected local database and use the data in the local database in the data analysis.

Information can be stored about the number of times a remote database is used in a data analysis, if the number exceeds a predefined value, the data can be stored locally.

The system can be configured to receive a specification of the desired type of data, such as time series data, or to determine the type of data relevant to the analysis, before the searching and the storing.

For remote databases found during the searching that contain the desired type of data, the system can determine information characteristic of the remote database, such as data frequency, data units, data scale, data source, data update date, and number of data points, and store the characteristic information in association with the location information. A data frequency value can be determined by calculating a time interval between individual data values. The characteristic information can be determined from at and XML data definition tag. A user can then specify a database characteristic and the system can search the stored database characteristic information to identify databases having the desired characteristic to the user.

The system can search for remote databases accessible via the Internet by reading network address information, such as uniform resource locator (URL) information, accessing a computer system located at network address using a communications protocol such as TCP/IP, and retrieving information from the computer system to determine whether the computer system provides access to a remote database, and storing location information for the computer system if it provides access to a remote database. The system can determine whether the remote database contains data of a desired type by using HTML formatted information, such as a meta tag, or XML formatted information.

For databases found that contain the desired type of data, the system can determine whether the database contains a data series, and, if so, store an indication of that in association with the location information for the remote database. For each data series, the system identifies a characteristic of the data series, and stores the characteristic information, such as whether the data series is a time series of data, with the location information for the remote database in which the data series is contained. For time series data, the characteristic information can be the number of data points, a starting time, an ending time, a time interval between the data points and data series format information. For each data series, the system can determine whether the data series is redundant of another data series for which information has already been stored, and if so, either storing information the redundant data series or not.

The system can determine whether a correlation exists between the data in a remote database and data in a data set, such as macroeconomic data, microeconomic data, demographic data or meteorological data, if the correlation exists, storing an indication of the correlation in association with the location information for the database. Volatility and seasonality of the data can be measured and stored in association with the location information for the database.

A data structure for storing information relating to a remote database accessible via a network of computer systems, such as the Internet, the data structure comprising a database key that uniquely identifies the database and location information that is stored if the data base contains the desired type of data. Alternatively, the location information is stored regardless of whether the database contains the desired type of data and data type information, which indicates whether the database contains the desired type of data, such as time series data, is also stored. The data structure also contains database descriptive information, database usage information, an indication of whether the database contains data that is used in a data analysis, information about when the database was last updated, information about whether payment is required to access the data contained in the database, and information necessary to access the data contained in the database, such as user identification information and a password.

Where the database contains a series of data, such as time series data, a data structure also contains a data series key, which uniquely identifies the data series, location information for the data series, and data series descriptive information. For time series data, the data structure contains information about the number of data points in the time series of data, a starting time, an ending time and a time interval between each of the data points. The data structure also contains information about whether the data series has been used in a data analysis and when the data series was last updated as well as information about the format of the at least one series of data contained in the at least one remote database, and the data series format information being stored in association with the data series key.

DETAILED DESCRIPTION OF THE INVENTION

The subheadings used herein are meant only so as to aid the reader and are not meant to be limiting or controlling upon the invention. Generally, the contents of each subheading are readily utilized in the other subheadings.

System Overview

Figure 1:
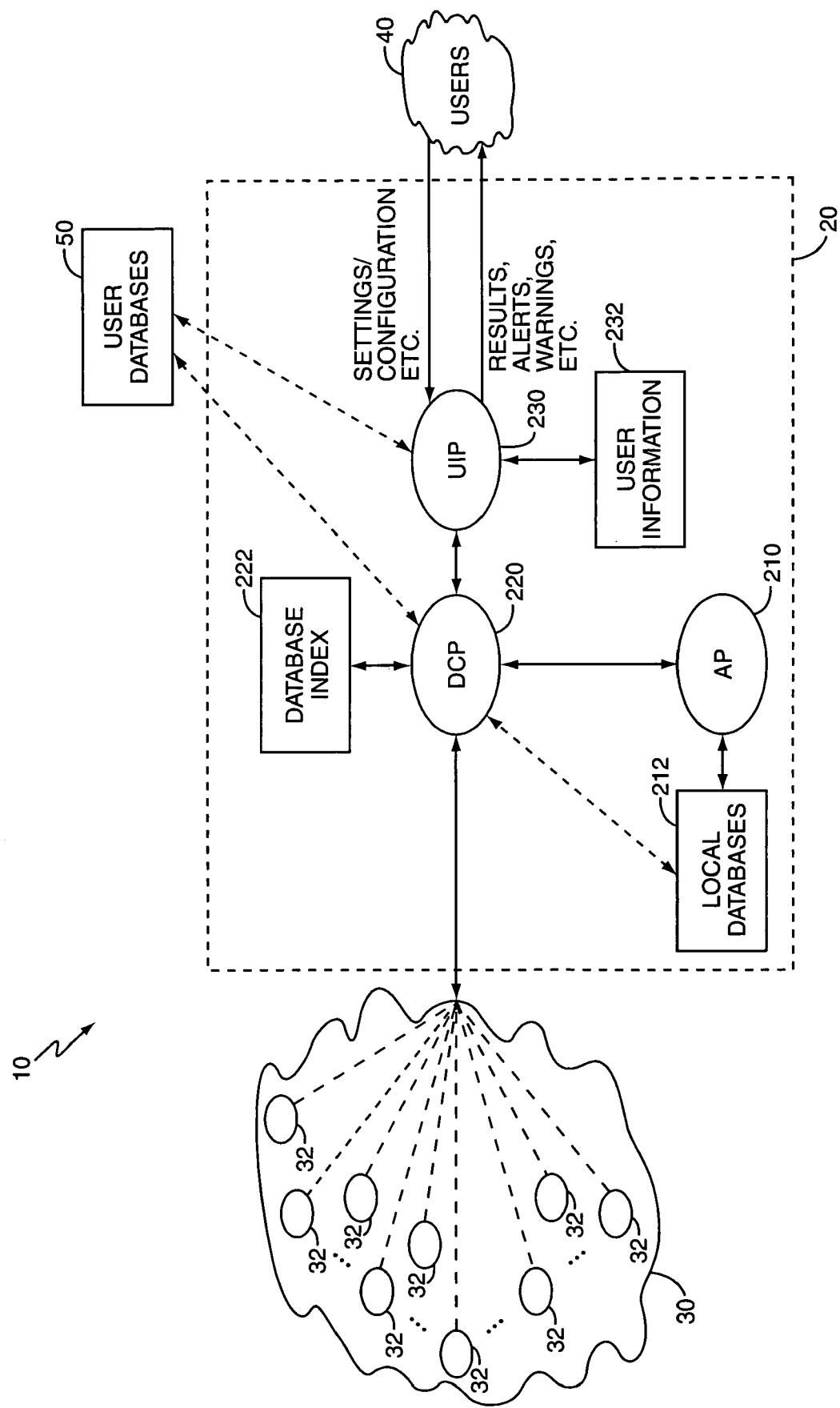
FIG. 1 provides a simplified illustration for one embodiment of the data analysis system of the present invention.

FIG. 1 presents a simplified illustration for an exemplary overall environment 10 in which the present invention may be advantageously practiced. In this embodiment, the data analysis system 20 of the present invention includes an analytical process 210 with associated local databases 212, a data collection process 220 with an associated local database index 222, and a user interface process 230 with associated local user information 232. This is a simplified functional depiction of the data analysis system 20; an exemplary physical depiction of a computer platform for supporting the data analysis system 20 appears later herein.

The data analysis system 20 interfaces with an information network 30 that includes a potentially large and disparate collection of computer systems 32 interconnected via the information network 30. Additionally, the data analysis system 20 may provide access by a number of users 40, and these users 40 may have one or more associated user databases 50 that may be of value to the data analysis system 20. These user databases 50 may be accessible to the data analysis system 20 through the information network 30, or through some other type of communications interface. Note that to the extent that the data analysis system 20 is itself connected within the information network 30, it may be considered as part of the information network 30 from the perspective of other computer systems 32 within the information network 30. However, for clarity, the data analysis system 20 is depicted separately.

Preferably, the information network 30 is a large computer network, such as the Internet, containing a significant number of computer systems 32, each of which may provide access to one or more sources of data (e.g., databases) that may be of value to the data analysis system 20 in one or more of its various analytical operations. For example, a given group of users 40 may all be interested in a given type of data (e.g., time-series data). In this scenario, the data analysis system 20 can undertake a search of the information network 30 in an attempt to locate at least some of the databases accessible via the information network 30. As will be discussed in greater detail later herein, the data analysis system 20 develops a database index 222 during such searching activities. Thus, the database index 222 can serve as a repository of local information for identifying the locations of various databases in the information network 30, and for indicating whether these various databases include the desired type of data.

It is not necessary for the data analysis system 20 to locate and identify all existent databases within the information network 30, but it is generally preferable to identify as many as possible. Significantly, the various users 40 do not have to indicate anything beyond a general preference for the type of analysis they desire from the data analysis system 20. That is, the data analysis system 20 can determine the broad type of data that will be desired for a given analysis, or for a given type of analyses. Further, the various users 40 do not have to indicate which sources of data within the information network 30 that are of particular interest to them. Indeed, significant value derives from the ability of the data analysis system 20 to locate and use data from a wide variety of data sources that may be unknown to the users 40, or may be of unappreciated relevance in a given analysis.

Individual users 40 may configure the data analysis system 20 to meet their specific needs. For example, an individual user 40 might specify the specific analysis desired (e.g., a price forecast for aluminum). Indeed, users 40 can customize the data analysis system 20 in a comprehensive fashion. Examples of possible user configuration settings include:

System services desired
Premium data services agreements
Billing structure and payment agreements
Custom data types or key characteristics of interest
Access information for any proprietary user data
Password and security settings from user side The information supporting the above configuration settings is preferably stored as the user information 232 accessible by the user interface process 230.

Elaborating on selected configuration points above, individual users 40 can provide information to the data analysis system 40 detailing to what extent, if any, they are willing to pay for the usage of databases indexed by the data analysis system 20. Further, a given user 40 may already maintain subscriptions to certain ones of the various databases 34 that require payment for access. In this instance, information provided by the given user 40 and stored as user information 232 can be used by the data analysis system 20 in accessing those particular databases 34 when performing analytical work for that user.

Users 40 are also presented with an opportunity to specify the type of data that is used to locate potentially useful databases 34 during the information network searching activities undertaken by the data collection process 220. In this sense, a specific user 40 may configure the data analysis system 20 to create a database index 222 specific to their particular data type needs. More commonly, however, multiple users 40 have a common need for the same type of overall data and the data analysis system creates an appropriate database index 222 for use by these users.

Similarly, specific ones of a group of users 40 sharing a common database index 222 can set their corresponding user information to indicate more particular requirements about the characteristics of the data used in their analyses. As noted elsewhere in the discussion, a given user 40 might configure the data analysis system 20 to use only databases 34 that are indicated as having, for example, governmental data (e.g., non private-sector data) in their requested analyses. Those skilled in the art will appreciate the wide range of configurable operations and behavior of the data analysis system 20 that can be tuned to the needs of individual users 40 based on the user information 232.

System Hardware Configuration

Figure 2:
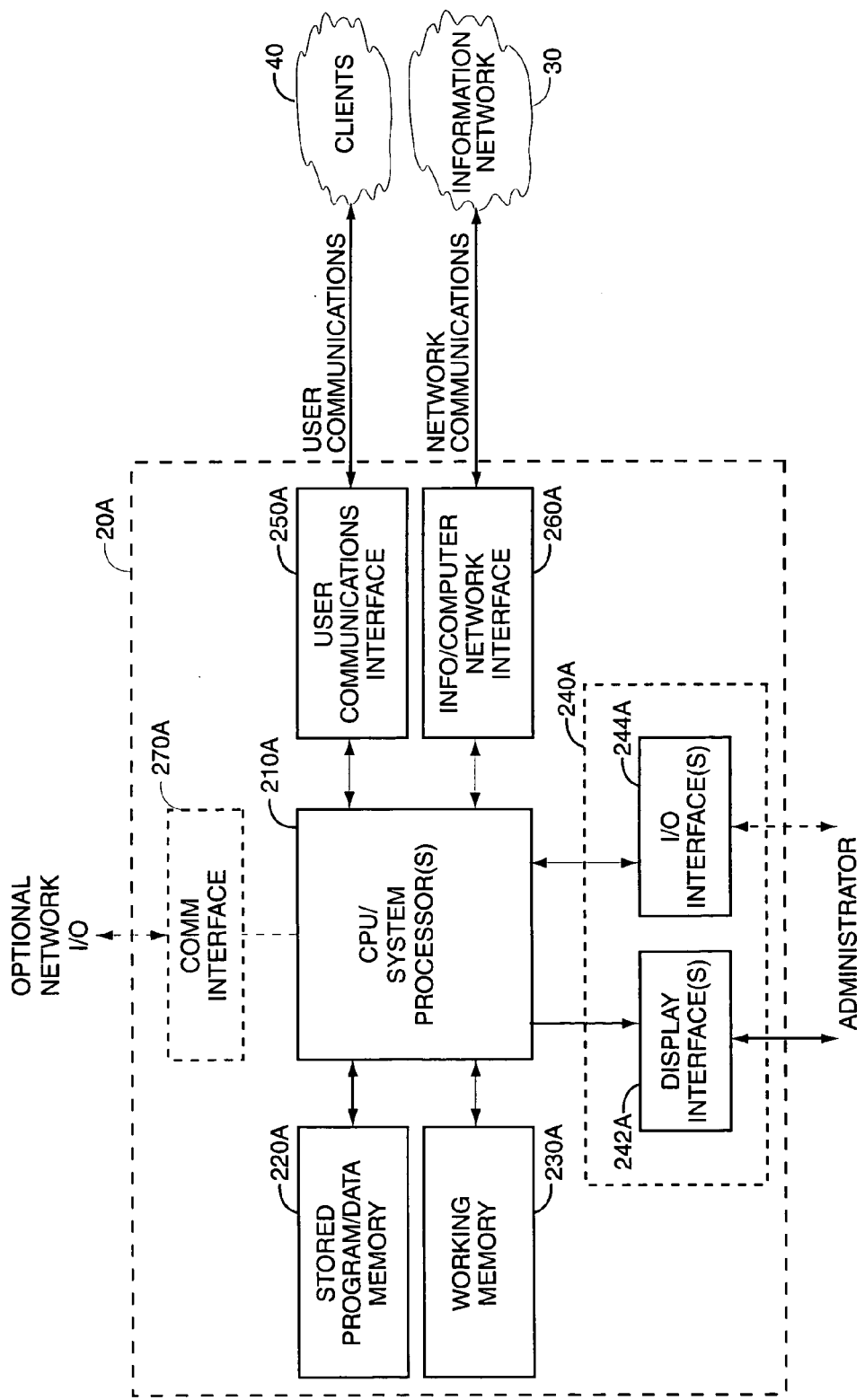
FIG. 2 illustrates a simplified physical diagram for the data analysis system of FIG. 1.

FIG. 2 provides a simplified depiction of an exemplary physical system 20A for implementing the data analysis system 20. The physical system 20A includes a system processor 210A, stored program and data memory 220A, working memory 230A, an administrative interface 240A including a local display interface 242A and a local I/O interface 244A, a user communications interface 250A, an information network interface 260A, and an optional, integrated communications interface 270A.

The system processor 210A may actually include multiple processors, such as in a symmetric multiprocessing environment (SMP), or may represent an interconnected set of processing systems. As such, the stored program and data memory 220A and working memory 230A may represent shared memory elements as appropriate to support the specific structure of the system processor 210A. The administrative interface 240A provides local access (e.g., monitors, keyboards, other I/O) for interacting with the data analysis system 20. The user communications interface 250A provides users 40 with the ability to exchange information with the data analysis system 20, and provide, in some configurations, access to various user databases 50.

The information network interface 260A provides a communications interface to the information network 30 depicted in FIG. 1. As such, the information network interface 260A may be, for example, a network interface card connecting the physical platform 20 with a computer LAN that in turn connects with an Internet gateway. The integrated communications interface 270A may, in some configurations, simply represent a common network communications interface that integrates the functionality of the user communications interface 250A and information network interface 260A. With this type of configuration, essentially any type of communications (e.g., user, administrative, and information network) may be supported through the integrated communications interface 270A.

While the illustration of the physical platform 20A provides helpful detail in that it depicts an advantageous embodiment for the data analysis system 20, it represents only one of many possible computer system architectures. Indeed, those skilled in the art will recognize that the functionality of the data analysis system 20 may be implemented in a variety of hardware configurations, ranging from single computer systems, to internet worked sets of associated computer hardware. The particular technique selected for implementation of the data analysis system 20 will depend upon the details of a given use or application. For example, if the type of analysis desired from the data analysis system 20 benefits from having substantial local stores of information, there may be significant requirements placed on the program and data memory 220A by the need to store large local databases 212.

Some embodiments of the data analysis system 20 combine functional aspects of the administrative and user interfaces 240A and 250A, respectively. In such an embodiment, the data analysis system 20 simply provides a user interface in keeping with a user's expectations for interacting with a software program. Preferably, the user interface process 230 functions as a user interface and allows varying levels of access to the overall workings of the data analysis system 20. In this manner, a user of the data analysis system 20 is able to interact with the data analysis system 20, configure it for various operations, and direct its operation as an analytical tool.

Thus, users 40 may communicate with and interact with the data analysis system 20 in a variety of ways, depending upon its particular configuration. Thus, the user communications interface 250A could be a network interface, a Web-based browser interface, or other types or combinations of communications interfaces. The needs of a specific implementation of the data analysis system will suggest the best realization of the user interface 250A.

System Relationship to Network

Figure 3:
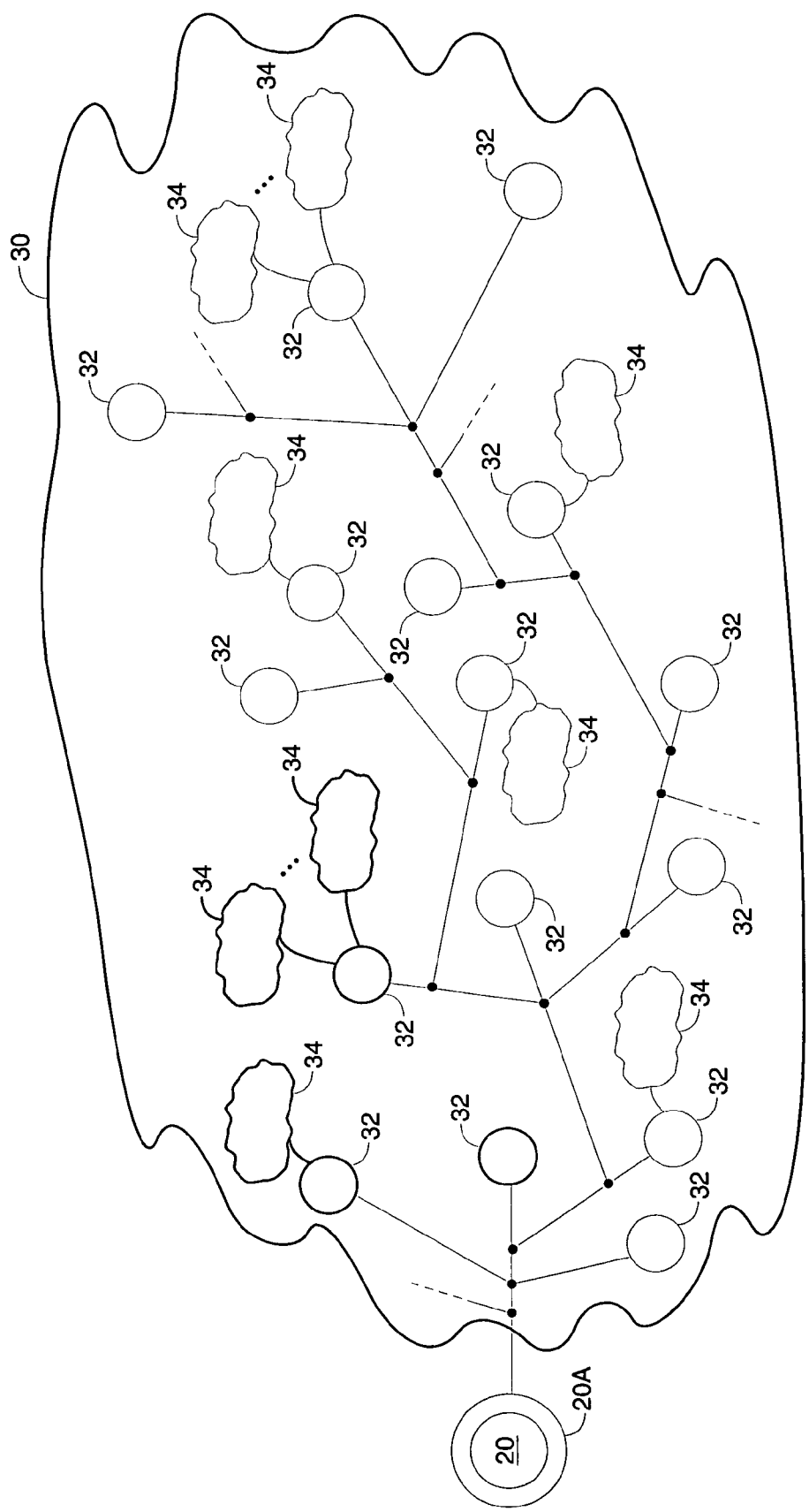
FIG. 3 illustrates the conceptual aspects of network access between the data analysis system of FIG. 1 and remote databases in a distributed information network.

FIG. 3 depicts the physical platform 20A hosting the data analysis system 20 as being interconnected with the information network 30, and provides the added detail of illustrating that some of the computer systems 32 within the information network 30 are associated with or provide access to one or more remote databases 34. By "remote," we mean that the database is not connected directly to computer or workstation upon which the data analysis system 20 is running. The number of computer systems 32 depicted in the illustration may represent only a small portion of the total number of computer systems 32 included within the information network 30. As earlier noted, information network 30 is preferably the Internet, or at least a collection of information networks that provide access to or interconnect with the Internet. As such, those skilled in the art will readily appreciate that the information network 30 includes supporting infrastructure (e.g. routers, etc.) not detailed in the illustration.

In keeping with the nature of Internet-based computer systems, the individual computer systems 32 may simply be Web servers that provide access to additional computer systems not shown in the illustration. Thus, the data analysis system 20 may have the capability of extending its search for data into a variety of remote computer systems (not illustrated) accessible through individual ones of the computer systems 32.

A "one-to-many" router serves as an example of how a given computer system 32 might provide access to multiple associated systems through a single network address within the information network 30. The router is identified within the information network 30 by a single, routable address. In turn, the router maps traffic through this one address to multiple systems connected to it by maintaining private, non-routable IP addresses for the systems in its private network. Traffic from the information network 30 received on the router's IP address is sent to the appropriate system in the private network based on port number information included in the traffic packets (e.g., in TCP/UDP packet headers) received by the router. In this scenario, each system in the router's private network resides on a unique router port. Those skilled in the art will appreciate that this and other techniques allow the data analysis system 20 to "see" into more than just the computer systems 32 interfaced directly to the information network 30.

Structure of Data Index

Figure 4:
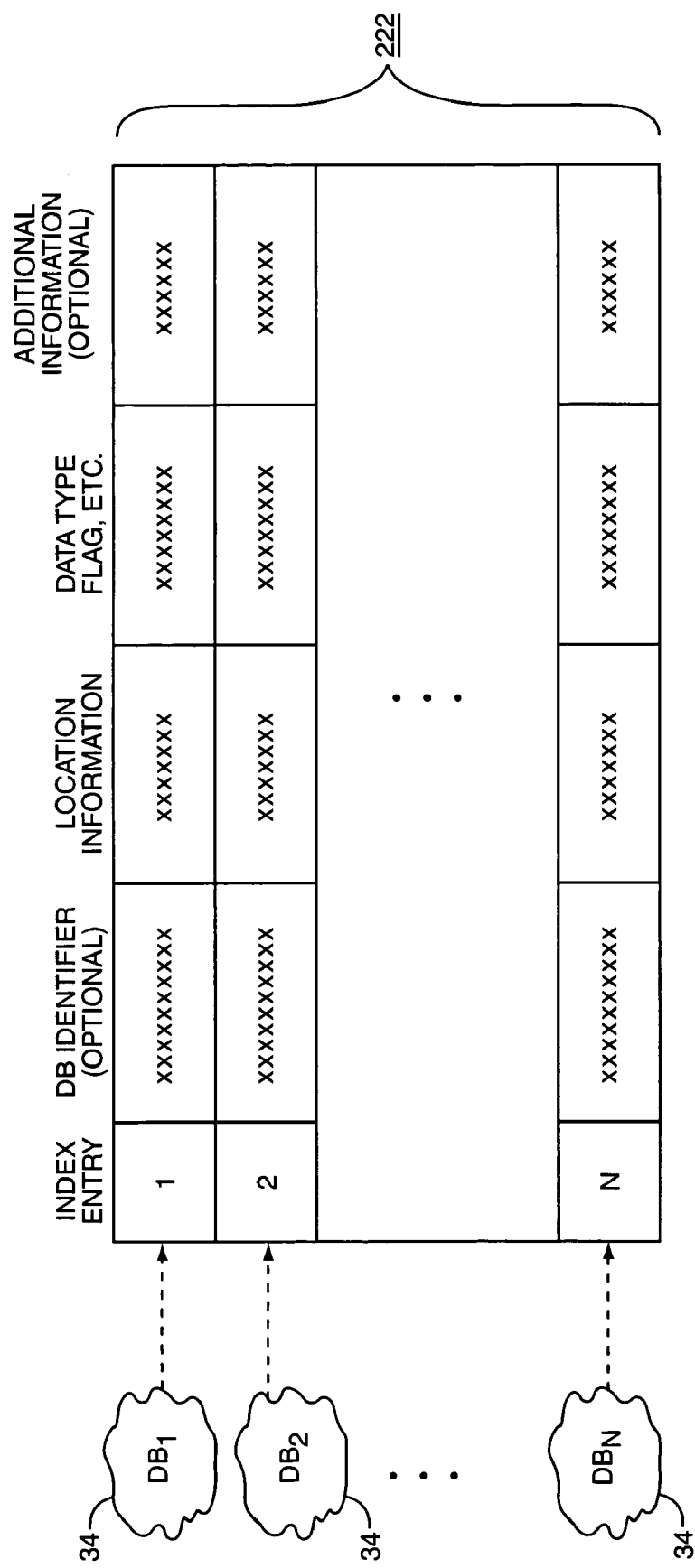
FIG. 4 illustrates a basic relationship between remote databases within the distributed information network of FIG. 3 and information stored in an exemplary database index structure associated with the present invention.

FIG. 4 illustrates a logical relationship between the databases 34 found by the data analysis system 20 and the resultant database index 222. In the scenario illustrated, the data analysis system 20 discovered a number of databases 34 (DB1, DB2, . . . , DBN) during searching and created individual entries in its database index 222 for each database 34 found. Each entry in the database index 222 includes at least a database key, which holds a unique value for each entry in the database index 222, and the location information for the database 34 that corresponds to a given entry. While significantly more detail regarding the search process appears later herein, it is helpful initially to understand the overall process. As shown in FIG. 3, various ones of the computer systems 32 within the information network 30 are associated with one or more databases 34.

For a given one of the computer systems 32, there may be a general network address associated with the computer system 32, information associated with certain files or Web pages associated with the computer system 32, and information particularly detailing the location and nature of any databases associated with the computer system 32. Any of this information, or any combination thereof, may be considered as broadly constituting location information for a given database 34. Each entry in the database index 222 may optionally include a descriptive identifier for the database 34 corresponding to the entry. Further, each entry in the database index 222 includes an indicator (or group of indicators) signifying whether the corresponding database 34 contains data of a desired type, that is, data considered potentially useful for any of the analyses the data analysis system 20 may be configured to perform. Other information, including additional control and processing flags may be included in the database index and are discussed later.

By including information in the database index 222 indicating whether a database 34 contains, in the broadest possible sense, potentially useful data, the database index 222 is useful in identifying both potentially valuable databases 34 within the information network 30, as well as identifying databases 34 within information network 30 that are most likely irrelevant for a given type of analysis. The data analysis system 20 may include additional information in each of the entries in the database index 222 relating to more particular details of the corresponding databases 34.

This additional information can provide significantly greater ability to determine whether a given remote database 34 may be of potential interest to particular ones of the users 40, or for use in particular ones of the analyses performed by the data analysis system 20. As will be explained in more detail, the database index 222 may be automatically searched by the data analysis system 20 using search criteria directly or indirectly provided by the users 40. Thus, the ability to search the database index 222 can be valuable to the users 40 by identifying specialized subsets of databases 34 accessible via the information network 30 that may be of particular interest.

Data Series Structure

Figure 5:
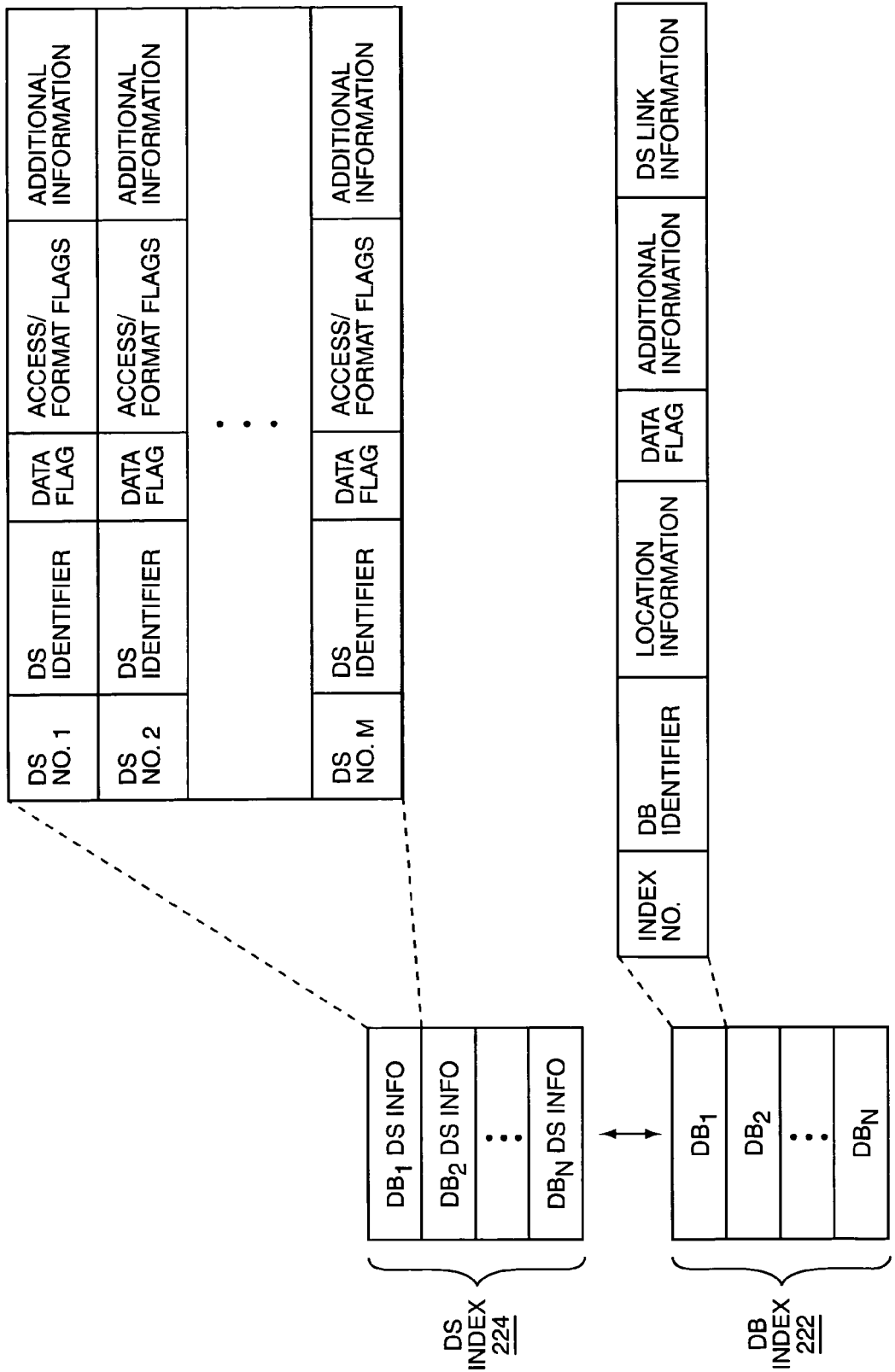
FIG. 5 provides more detail regarding the database index of FIG. 4.

FIG. 5 provides additional detail for the exemplary structure of the database index 222 introduced in FIG. 4. A data series index 224 may be created and maintained by the data analysis system 20 in conjunction with the database index 222. Because a given database 34 may well include a plurality of individual data series, processing and recording information for further various databases 34 found by the data analysis system 20 should include the capability of managing information for the individual data series within a given database 34. Thus, the data series index 224 provides a framework for storing pertinent information on a per series basis. For example, DB1 (represented as the first entry in the database index 222) may include multiple data series (DS1, DS2, . . . , DSM). Thus the entry for DB1 in the database index 222 would include links or references to multiple, corresponding data series entries in the data series index 224.

Each data series entry in the data series index 224 may include information similar to that maintained for the overall database 34. That is, each data series may be assessed to determine whether the individual data series contains a desired type of data, and each data series entry can have additional information providing characteristic information about the type of data contained in the data series corresponding to the entry. Other information can be included in each data series entry, as will be discussed later herein.

System Search Logic

Figure 6A:
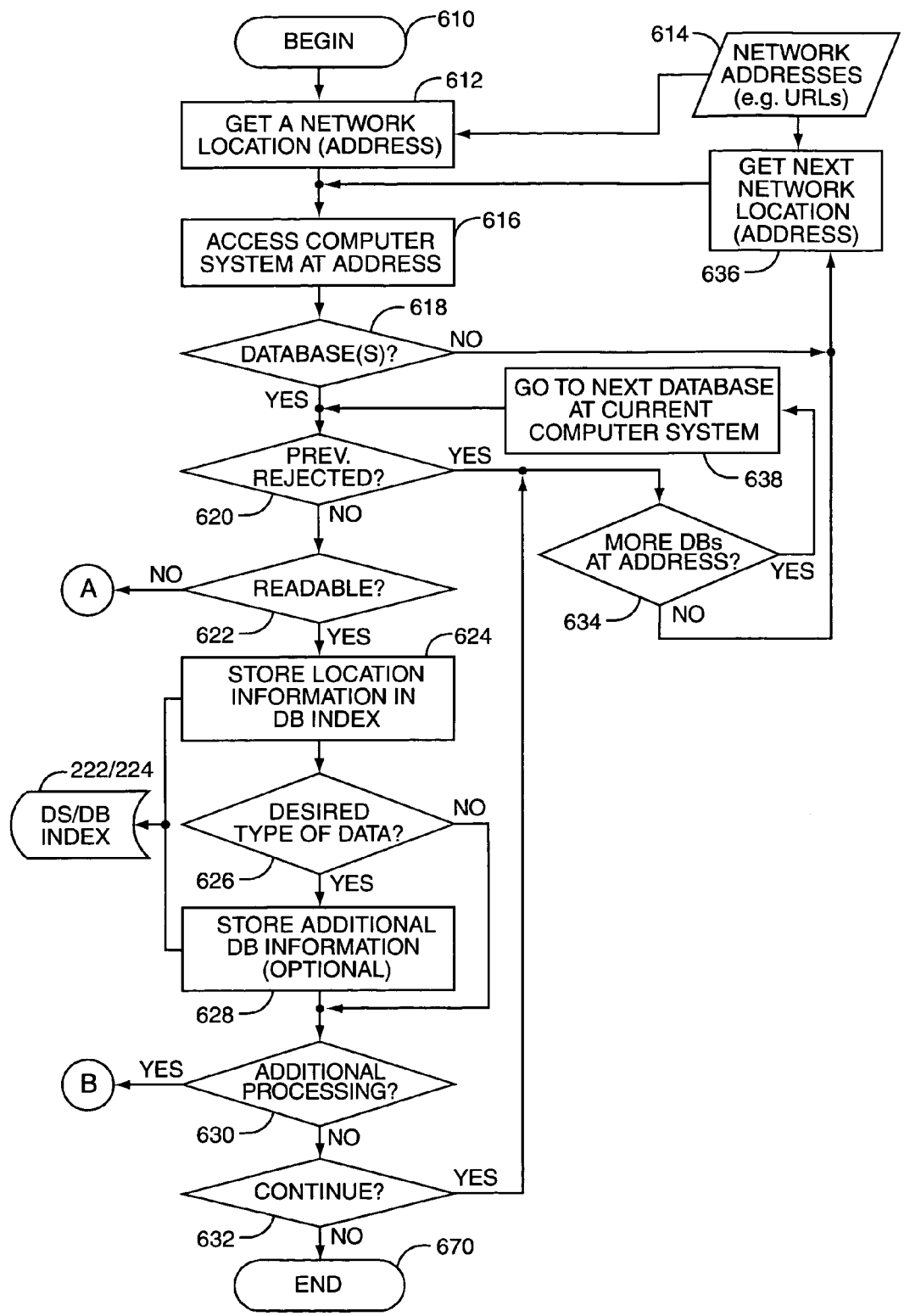
FIGS. 6A, 6B, and 6C illustrate simplified flow logic for the information network searching activities associated with some embodiments of the present invention.
Figure 6B:
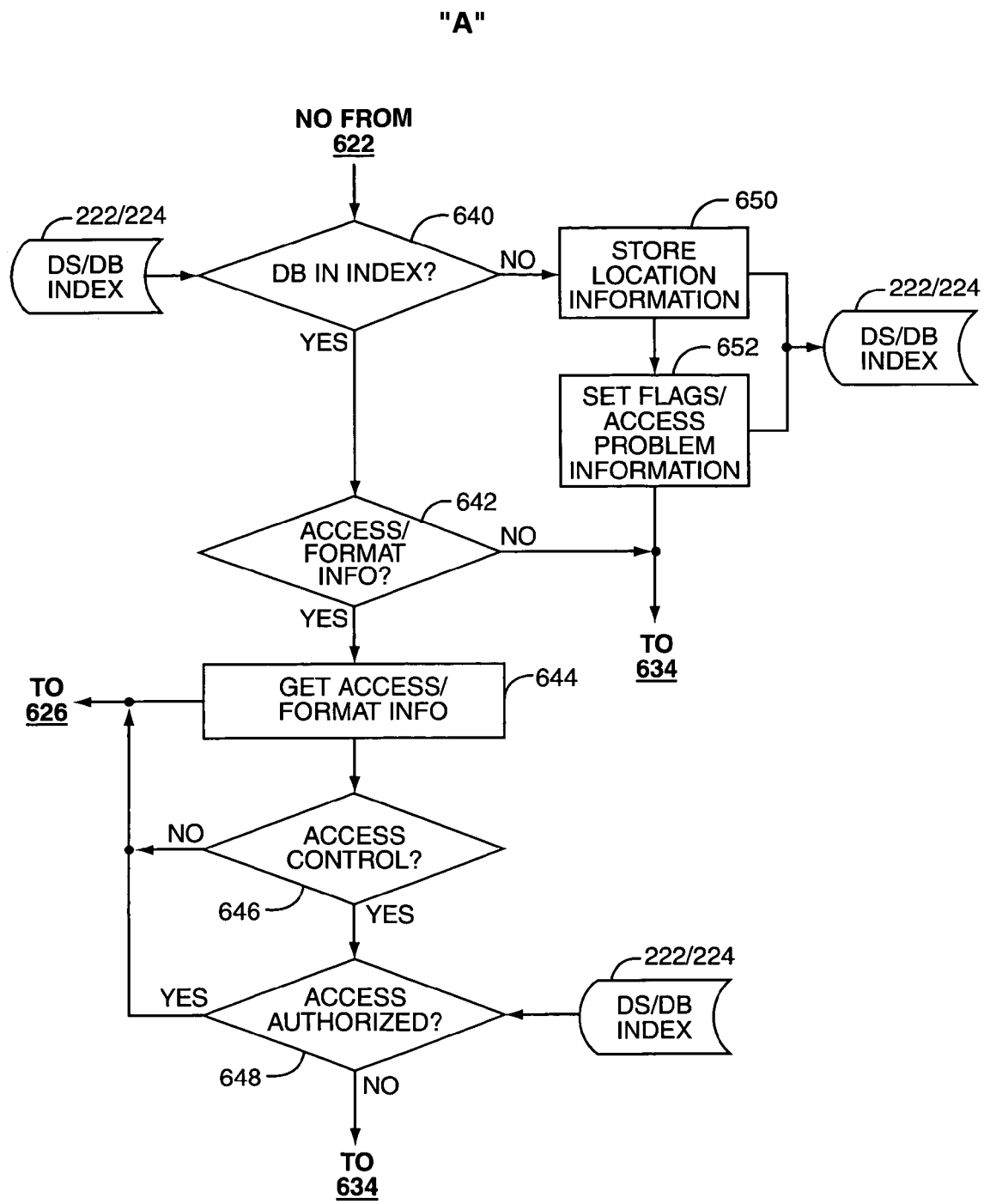
Figure 6C:
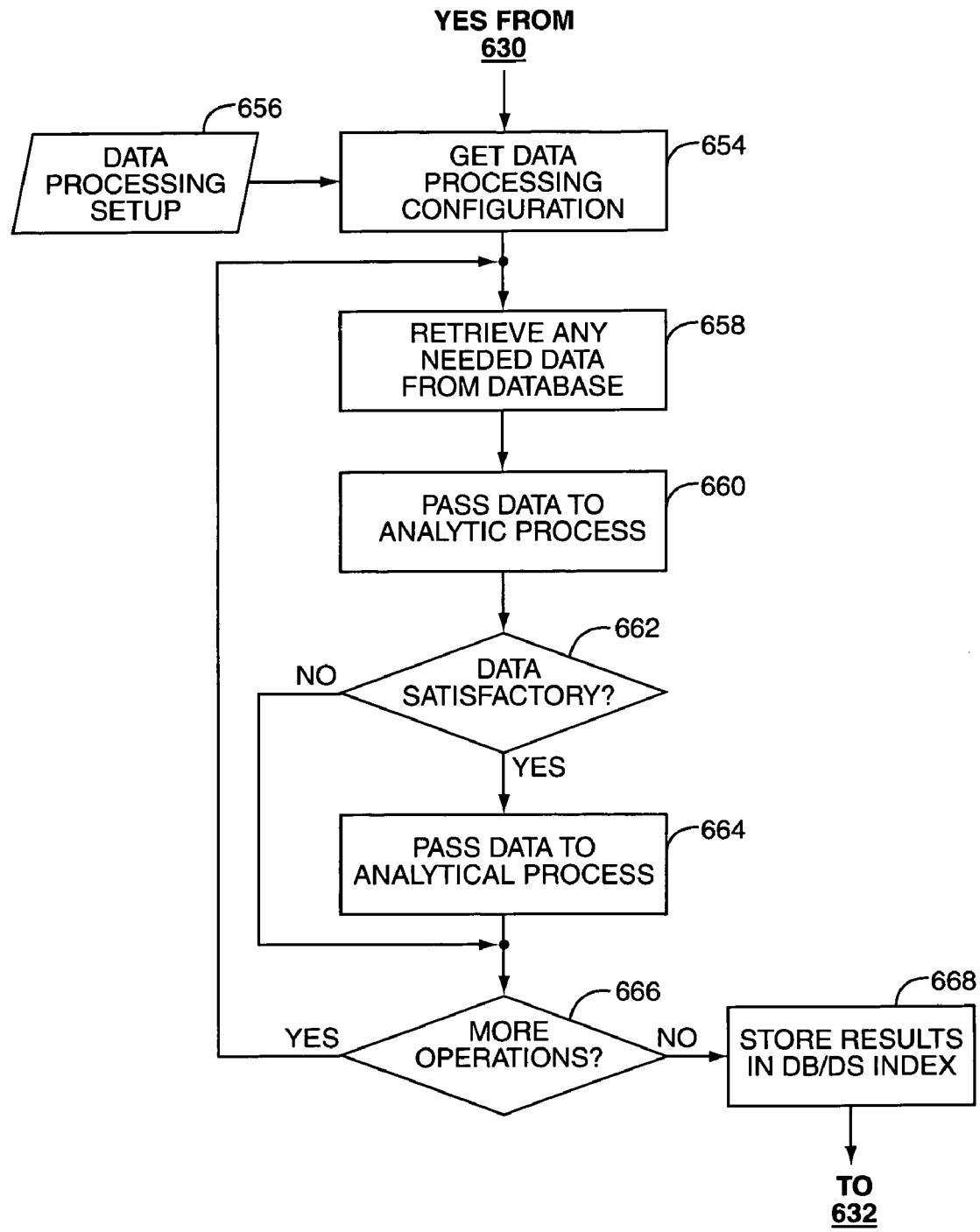

FIGS. 6A, 6B, and 6C collectively illustrate exemplary logic for searching the information network 30 for one or more remote databases 34. Preferably, the data collection process 220 includes the illustrated functionality. When discussing the illustrated logic, the term "current database" refers to the particular database 34 being processed by the data analysis system 20 in a given operation. Typically, the illustrated logic is undertaken by the data analysis system 20 in an effort to identify a potentially large group of databases 34 that (1) are accessible via the information network; and (2) that include a desired type of data.

With respect to identifying databases that include a desired type of data, the data analysis system 20 is advantageously designed to be flexible. For example, there may be a group of users 40 interested in using the data analysis system 20 to provide a variety of economic forecasts. While each user 40 may desire a different economic forecast, the type of data appropriate for use in all of their problems is similar. (In this case, all of forecasts for the different users 40 might be based on the analysis of various, different time series data.) Because the data analysis system 20 can serve many users 40, each with potentially different interests, the desired type of data may vary from one search to the next, depending upon the broad type of data that is most appropriate for a given user problem or groups of user problems.

Thus, the data analysis system 20 may be configured to search for whatever type of data best suits a given problem or class of problems. One ancillary requirement of this ability is that the data analysis system 20 be able to either use a common database index 222 for a variety of desired data types, or be able to work with multiple database indexes 222, each created using different criteria for qualifying the desired type of data.

The term "remote computer" refers to the particular computer system 32 within the information network that includes or provides access to the current database. When data is termed "local," such data is local with respect to the data analysis system 20, and data that is termed "remote" means data that is stored remotely from the data analysis system 20 on whichever one of the various computer systems 32 involved at a given point in the searching. Certain remote data may also come from supporting elements within the information network 30 that are not illustrated (such as routers and gateways).

Processing begins (block 610) with the data analysis system 20 obtaining a network location (e.g., uniform resource locator) from an appropriate source of network addresses (blocks 612 and 614). As those skilled in the art will readily appreciate, the source of network addresses may come from the information network 30 itself, such as from a table of routable network addresses maintained in a router or network gateway (neither shown). Alternatively, the data analysis system 20 may use local information to identify computer systems 32 within the information network 30. These techniques may be combined so that, for example, data analysis system users (e.g., administrators) configure the data analysis system 20 with a number of known network addresses, and allow the data analysis system 20 to use these plus other addresses it finds on its own.

In the case where the information network 30 is at least a portion of the Internet, network address information might include both a routable IP address, as well as specific HTML page information. For the purposes of discussion herein, it is assumed that data collection process 220 includes or is associated with software providing compatibility with various protocols and encoding standards, including TCP/IP, HTML, XML, and others.

Some computer systems 32 within the information network 30 may provide access to additional private computer networks (not illustrated). To the extent that given ones of the computer systems 32 permit access to such private networks, those private networks may be considered a part of the overall set of resources available to the data analysis system 20. Indeed, this represents a likely way for users 40 to make private user databases 50 available to the data analysis system 20 during selected analyses.

As an example, the data analysis system 20 might be configured to perform a specific analysis for a specific user. If this particular analysis benefits from access to proprietary user data, the data analysis system 20 can be configured with specific address and access control information, such as user identification and password, such that the proprietary user data may be accessed and used for that user's analysis, but not in the other analyses run for other users 40.

Once the data analysis system 20 obtains a valid network address (block 612), it proceeds by accessing the computer system 32 corresponding to the current address (block 616). For simplicity, invalid address handling procedures are not illustrated, but those skilled in the art will readily appreciate that the data analysis system 20 may simply sequence to the next available address if a current address proves invalid. If information available on or accessible through the current computer system 32 indicates the presence of at least one database 34 (block 618), the data analysis system 20 selects the first available database 34 as the current database 34. The data analysis system 20 then determines whether the current database 34 has been rejected in earlier searching activities (block 620). The data collection process 220 may access the database index 222 to make such a determination.

If the current database 34 was rejected in earlier searching, the data analysis system 20 determines whether the current computer system 32 provides access to any more databases 34 (block 634). If not, the data analysis system 20 gets the next available network address (block 636) and advances its search to the computer system 32 corresponding to this next address (block 616).

If there are one or more additional databases 34 at the current computer system 32 (block 634), the data analysis system 20 accesses the next one of those databases 34 (block 638) and determines whether this next database 34 has been previously rejected (block 620). Depending upon how databases 34 are stored on a given computer system 32, the data analysis system 20 may directly access a given database 34, or may access information associated with the database 34 stored in conjunction with the database 34.

For a current database 34 that has not been previously rejected (block 620), the data analysis system 20 determines whether the current database 34 is "readable" (block 622). By way of example, and without limiting the scope of the invention, the current database 34 is not "readable" if the current database 34 may be accessible (e.g., it is not access-restricted), but has an unknown or indecipherable format. Conversely, the current database may not be readable even though the format of the current database 34 is understandable, if the data analysis system 20 needs to present the computer system 32 hosting the current database 34 with a password or other access-control information to access the database 34.

Insuring that the data analysis system 20 has the capability of understanding a wide variety of file formats and formatting arrangements significantly enhances its utility. One practical way of ensuring format adaptability is to imbue the data collection process 220 with the ability to read data formatting tags that may be embedded in or stored in association with the current database 34. XML tags are an example of such formatting tags. Thus, the data collection process 220 could read available XML data definition tags to determine the format and characteristics of a given database.

If the current database 34 is unreadable (block 622), processing continues with logic "A" that is detailed in FIG. 6B. If the data analysis system 20 determines that the current database 34 is readable (block 622), it stores location information for the current database 34 in the database index 222 (block 624). If the current database 34 contains the desired type of the data (block 626), the data analysis system 20 may optionally store additional information for the current database 34 in the database index 222 (block 628). As discussed, additional information typically includes more detailed data characteristics (e.g., units, scale, frequency). Many other types of additional information, such as information about what organization maintains the database may be included in the additional information stored for the current database 34. If the database 34 does not contain the desired type of data, the data collection process 220 preferably does not store additional information about the database 34. Alternatively, if the database 34 does not contain the desired type of data, the data collection process may not store any location information for the database 34, and no entry corresponding to the database 34 will be made in the database index 222.

The data analysis system 20 then determines whether the data collection process 220 has been configured to initiate additional processing of information contained in or associated with the current database 34 (block 630). As alluded to earlier, the data collection process 220 can retrieve additional information related to current database 34 from the computer system 32 that may be helpful in better characterizing the nature of the current database 34. Details for this additional processing are provided in logic group "B" in FIG. 6C.

If the data analysis system 20 is not configured for additional database processing (block 630), it determines whether to continue database-searching operations (block 632). The data analysis system 20 may cease searching activities based on operator input, based on the number of databases already located, or on various other criteria (block 670). If searching continues, the data analysis system 20 determines if there are more databases associated with the current computer system 32 (block 634). Processing then continues as described above.

Logic group A, detailed in FIG. 6B illustrates exemplary provisions for handling any unreadable databases 34 encountered during searching. As noted, the unreadable condition may result from certain access controls placed on the current database 34, as might be applied to a commercial pay-for-use database. Or, the condition might result from the database 34 being in an unknown format. If an unreadable database 34 is encountered (block 622, FIG. 6A), the data analysis system 20 determines if the database 34 has been previously indexed (found before) (block 640). Information stored in the database or data series indexes 222 and 224, respectively, may be used to make this determination. If this is a newly encountered unreadable database 34, the data analysis system stores location information for the current database 34 in the database index 222 (block 650), sets the appropriate flags and indicators, and stores any helpful problem information (block 652). Processing then continues with checking for more databases at the current computer system 32 (block 634, FIG. 6A).

Flags, indicators, and problem information stored for the unreadable database 34 serve a number of functions. First, by storing location information and appropriate flags (e.g., unknown formatting, access restricted), the data analysis system 20 marks the current database as found but unreadable. This information may be used by the data analysis system 20 when the same database 34 is encountered again during subsequent searching, or when explicitly directed to revisit the database 34, such as by a user of the data analysis system 20. Indeed, the indicator(s) provided by the data analysis system 20 upon finding an unreadable database 34 may serve to notify users that such an event has occurred. Upon such notice, a system user may determine what information is needed to read the database 34 (or databases 34) in question. This type of supporting information may be entered into the data analysis system 20 for its use in re-accessing any databases 34 it was previously unable to read.

If the unreadable database 34 already has an entry in the database index 222 (block 640), the data analysis system 20 checks for the presence of local access control information or local formatting information (block 642). If such information is present, the data analysis system 20 reads this information (block 644) and determines whether the readability problem arises from formatting or access control issues (block 646). If the problem is one of formatting, the data analysis system 20 uses the local formatting information to read the database 34, or read the related information stored on the computer system 32 in association with the database 34 (block 626, FIG. 6A) to determine if the database 34 contains the desired type of data.

If the readability problem arises from access control restrictions (block 646), the data analysis system 20 determines whether access is authorized (block 648). If authorized, processing continues with the data analysis system 20 determining if the database 34 contains the desired type of data (block 626, FIG. 6A). Absent authorization, the data analysis system 20 determines if any other databases 34 are available at the current computer system 32 (block 634, FIG. 6A). Such authorization may be a global configuration setting for the data analysis system 20. In this case, an administrator or other system user may provide the data analysis system 20 with a list of databases 34 for which access is authorized, or configuration information stored for the users 40 may set such access authorization for single users 40 or groups of users 40. In this manner, the user interface process 230 may use client configuration information to control whether the data analysis system 20 uses a pay-for-use database 34 in a given user's analysis, based on that user's willingness to incur charges for such use.

The data analysis system 20 preferably includes within its user interface process 230 program routines for tracking which databases 34 are used in the respective analyses performed for individual users 40 for billing purposes. The data analysis system 20 also maintains potentially comprehensive local databases 212 and may assess charges against users 40 based on the extent that such local data is used in their analyses.

FIG. 6C provides details for logic group B, which relates to any additional processing optionally undertaken by the data analysis system 20 during searching activities. The data analysis system 20 gets configuration information detailing the type of additional database processing desired (block 654). Such configuration information (block 656) may come from stored user information 232, or may come from overall system configuration information maintained locally by the data analysis system 20. The ability to use user information for controlling the additional processing allows users 40 to use the data analysis system 20 to create very detailed database indexes 222. The data analysis system 20 retrieves any information needed for the additional processing from the current database 34, or additional information for the database 34 that is accessible through the hosting computer system 32 (block 658).

This database information and processing settings are passed to the analytical process 210 by the data collection process 220 (block 660). If the database information is sufficient to support the desired additional processing (e.g., a minimum number of data points, etc.) (block 662), processing continues with the analytical process 210 performing the additional processing (block 664).

Substantial flexibility exists with regard to the additional processing. For example, it may be useful to note in the database index 222, the correlation of data in the potentially useful databases 34 with economic, demographic or meteorological data. Economic data can be either microeconomic data or macroeconomic data. Microeconomic data could include information about companies whose stock is publicly trade, such as share price, dividends, earnings, revenues and expenses. Macroeconomic data could include data relating to prices, productivity demand and employment. Price information could include prices of securities, such as stock and bond prices as well as stock price indices such as the Dow Jones Industrial Average, the Standard & Poor's 500 and the NASDAQ composite index. Other price information could be information about prices of products and services, including the consumer price index ("CPI") and the producer price index ("PPI"), as well as wages and interest rates. An example of demand information might be housing starts. Examples of demographic include population by household, region, age group and ethnicity. Other demographic information might include information about immigration and emigration, careers and job types and health information, including information about diseases and disability.

As another example, calculating the volatility or seasonality for some or all of the data in the potentially useful databases 34 indexed in the database index 222 may increase efficiency in later user analyses by skipping any databases 34 whose volatility or seasonality exceeds a certain threshold. Those skilled in the art will immediately appreciate the many derived characteristics that might be determined and stored in the database index 222 for the potentially useful database 34.

The ability to derive additional characteristics for the databases 34 found by the data collection process 220 during searching of the information network 30 represents a significant advantage in that a great deal of characterization information is contained in the database index 222. As earlier noted, this allows the data analysis system 20 to use detailed and subtle criteria for selecting subsets of databases 34 most suitable for a particular analysis. Any additional information derived for the current database 34 is stored in the database index 222 (or stored in association with the entry in the database index 222 that corresponds with the current database 34).

While the above discussion is presented in terms of databases 34, those skilled in the art will appreciate that databases in general include multiple data series. Oftentimes, there are substantive differences in the underlying nature of the data represented by the different data series within a given database 34. As such, it should be understood that the above discussion anticipates handling individual data series as is necessary within each database 34. Thus, the data type qualification and additional information/processing operations detailed above may be considered to include performing such operations, as needed, on individual data series.

Data Series Processing

FIGS. 7A, 7B, 7C, and 7D illustrate exemplary details for some aspects of data series processing. As with the discussion above, the data searching and processing functionality encompassed in FIG. 7 is preferably included within the data collection process 220 of the data analysis system 20. Databases 34 found by the data analysis system 20 may each include multiple data series. Furthering this example, a given database 34 might include several data series, with only some of the data series containing the desired type of data. Thus, the ability to process, qualify, and, optionally, analyze, data on a per data series basis within the databases 34 imparts significant additional flexibility to the data analysis system 20.

Figure 7A:
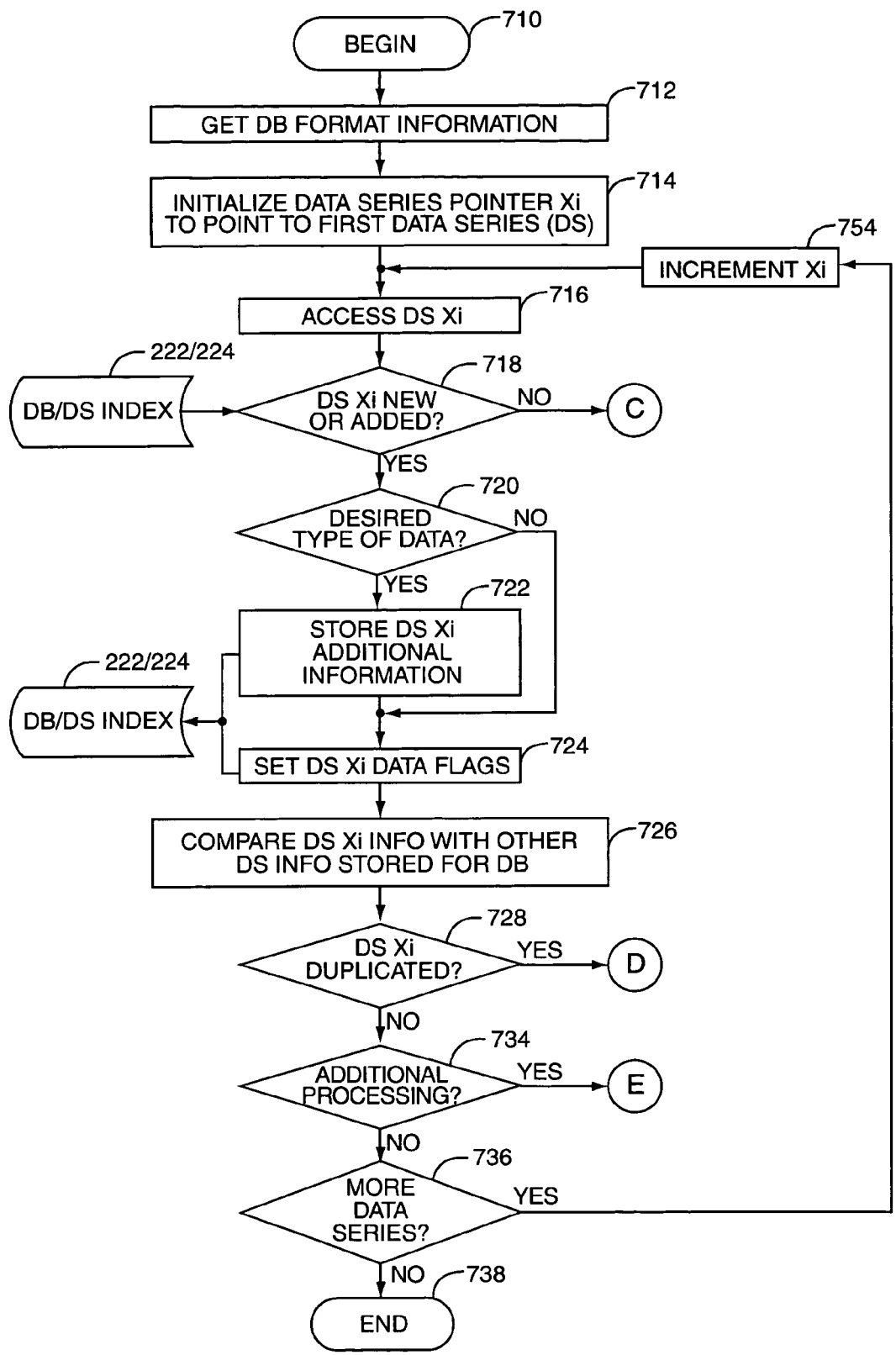
FIGS. 7A, 7B, 7C, and 7D illustrate more detailed processing associated with the logic illustrated in FIG. 6.

The following discussion of exemplary data series processing assumes the data analysis system 20 has located a given database 34. As shown in FIG. 7A, processing begins (block 710) with the data analysis system 20 obtaining format information for the given database 34 (block 712). Format information typically resides on the computer system 32 hosting the given database 34, although the data analysis system 20 may have locally stored format information available as well. The data analysis system 20 initializes a data pointer Xi to point to the first data series in the given database 34 (block 714). The data analysis system 20 accesses the data series (block 716) to determine if the data series is new or added to the given database 34 (block 718). This check is meaningful when the given database 34 was indexed by the data analysis system during an earlier search. Because of variations in the way databases 34 are stored within the information network 30, data series-based operations may involve the data series themselves, or may use information describing the data series that is stored in association with the given database 34.

Figure 7B:
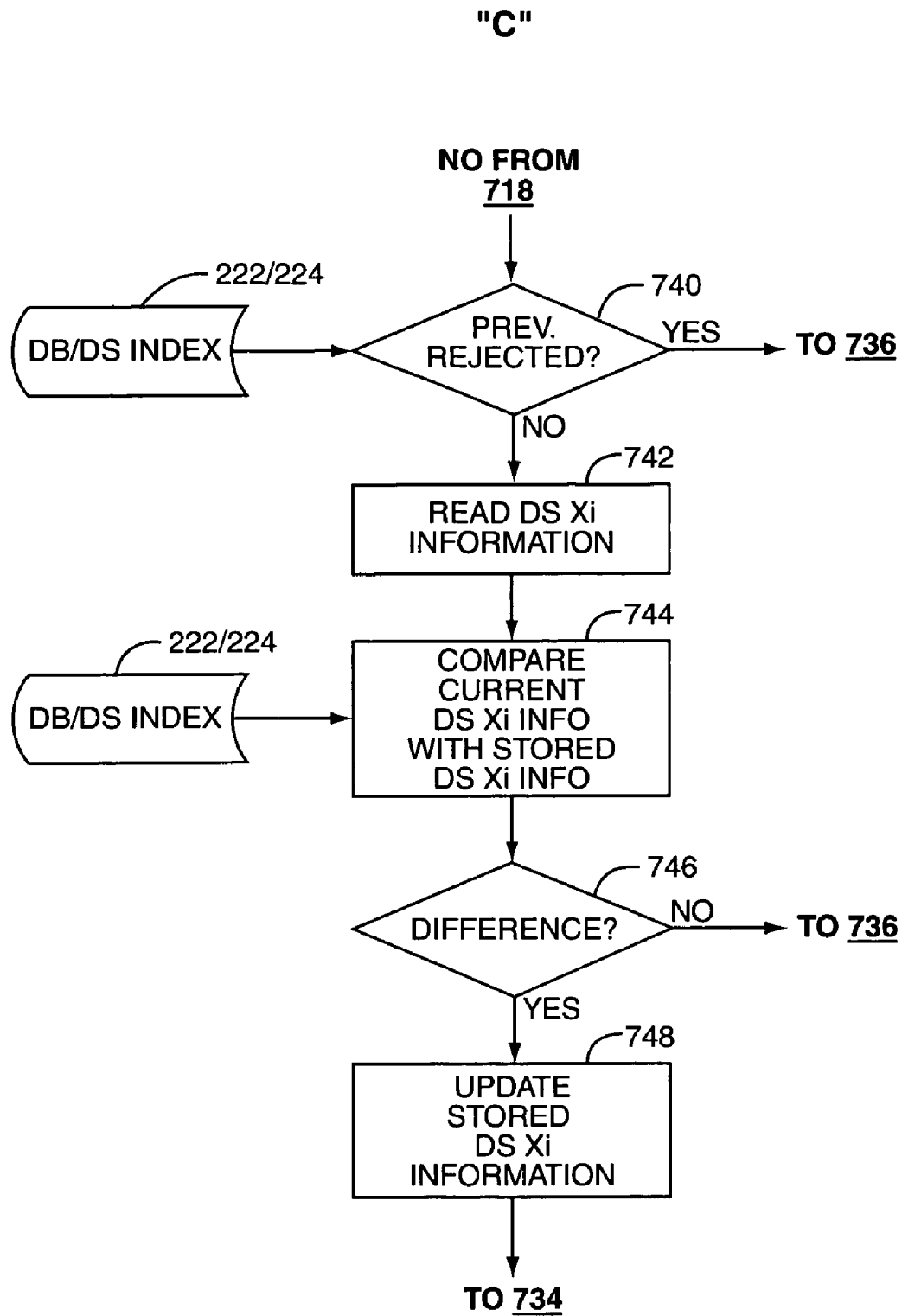

If the data series is not new or added (block 718), processing continues with logic group "C" that is illustrated in FIG. 7B. However, if the data series is new, processing continues with the data analysis system 20 determining whether the current data series contains the desired type of data (block 720). As earlier noted, the desired type of data is typically a broad data type, such as time series data, or cross-sectional data (e.g., a number of data values representing different items at a common point in time). If the current data series includes the desired type of data (block 720), the data analysis system 20 stores information for the current data series in the data series index 224 in association with the corresponding database entry in the database index 222 (block 722). Additional information might include units, scale, frequency, number of data points, etc. If the current data series does not include the desired type of data (block 720), processing bypasses the storing of additional information. In either case, the appropriate flags or indicators are set in the data series index 224 (block 724).

Figure 7C:
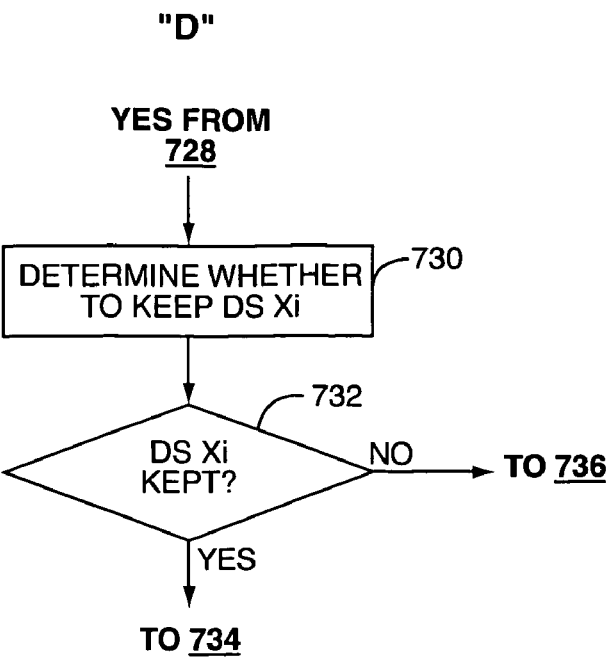

Next, the data analysis system 20 compares the current data series information with other data series information (block 726), and determines whether the current data series information duplicates data series information already stored in the data series index 224 for the current database 34 (block 728). If the current data series is a duplicate, processing continues with logic group "D" that is illustrated in FIG. 7C. If the current data series is not a duplicate, the data analysis system 20 determines if any additional processing of the data series (or information related to it) is desired (block 734). This determination is similar to that earlier discussed in association with FIG. 6C. If no additional processing is desired (block 734), the data analysis system 20 determines if there are additional data series available in the current database 34 (block 736). If so, the data series pointer is incremented (block 754) and processing continues for the next data series (block 716).

If the current database 34 is being processed for the first time by the data analysis system 20, then all of its data series will be new. However, if the given database 34 has been previously indexed by the data analysis system 20, it may be advantageous to include processing routines for determining whether the current data series is new (block 718) to minimize unnecessary processing. FIG. 7B details logic group C, which handles data series that are not new. If the current data series is not new (block 718, FIG. 7A), processing continues with the data analysis system 20 determining whether the current data series is changed from the point at which it was last processed.

Next, the data analysis system 20 determines whether the current data series has been previously rejected (block 740). Such rejection might arise from the data series failing to contain the desired type of data, or can arise from other factors affecting its ability to be used by the data analysis system 20. If the current data series has been previously rejected (block 740), processing continues with the data analysis system 20 determining whether the given database contains additional data series (block 736, FIG. 7A) and processing continues as explained above. If the current data series had not been previously rejected (block 740), the data analysis system 20 reads remote information from the current data series, or reads information stored on the remote computer system 32 bearing on the current data series (block 742).

The information retrieved from the remote computer system 32 for the current data series is compared with similar information previously stored by the data analysis system 20 for the current data series (block 744). By comparing current information (remote information) with previously stored information (local information), the data analysis system 20 determines whether the current data series has changed, or has been updated at the remote computer system 32.

If the comparison indicates a difference between the local and remote data for the current data series (block 746), the data analysis system 20 updates its locally stored information for the current data series (block 748). The data analysis system 20 then continues processing, determining whether to update any optional analyses for the current data series using the updated information (block 734, FIG. 7A). If there is no difference between the remote data and the local data for the current data series (block 746), the data analysis system 20 continues processing based on determining if the given database 34 contains additional data series (block 736, FIG. 7A).

FIG. 7C illustrates exemplary logic (logic group "D") for handling redundant or duplicate data series. As a way of reducing the number of data sources that are index, the data analysis system 20 compares the current data series information with other data series information (block 726, FIG. 7A), and determines whether the current data series is a duplicate of any other data series already indexed for the given database 34 (block 726, FIG. 7A). If the data series is duplicated (block 728, FIG. 7A), the data analysis system 20 attempts to determine which of the duplicated data series to retain. For example, one of the duplicated data series might represent information from a preferred source. If enough information is available to the data analysis system 20, it determines which of the duplicated data series to retain (block 730). The data analysis system 20 may simply default to eliminating the current data series if it is redundant, or may choose to store the redundant data, or information about the redundant data. If the current data series is stored (block 732), processing continues with the data analysis system 20 determining whether any additional processing should be performed on the current data series (block 734, FIG. 7A). If the current data series is not stored, the data series 20 determines if the current database 34 contains additional data series (block 736, FIG. 7A).

Figure 7D:
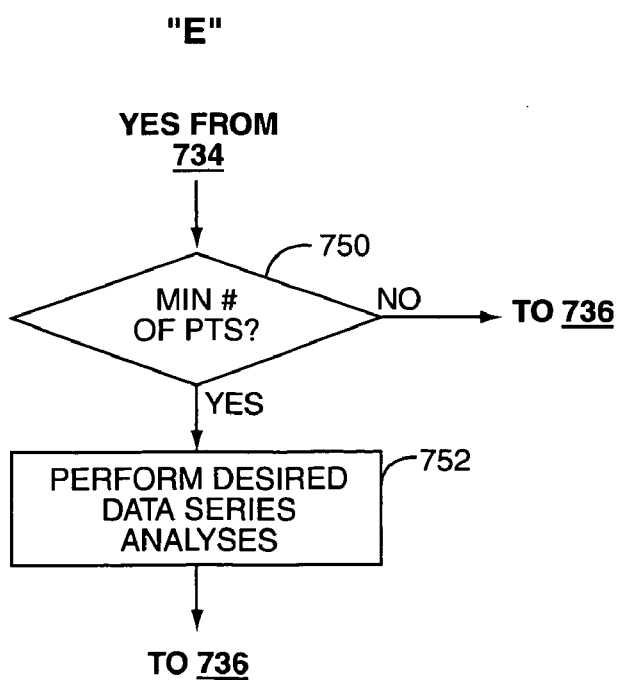

FIG. 7D provides simplified logic for logic group "E". Processing is similar to the optional processing performed by the analytical process 210 of FIG. 1 at the database level described in the context of FIGS. 6A, 6B and 6C. If the current data series supports a sufficient number of data points for the desired processing (block 750), such processing is performed and the results, such as statistical data descriptors, are stored in the data series index 222 by the data analysis system 20 (block 752). Processing then continues with the data analysis system 20 checking for more data series (block 736, FIG. 7A).

As those skilled in the art will appreciate, there are many variations on how the data analysis system 20 can be programmed to search for and index databases 34, including how individual data series within the databases 34 are handled. In light of this range of variation, the foregoing illustrations of logical processing should not be construed as limiting the data analysis system to a specific order of steps or to a specific structural implementation. The logic detailed above provides an exemplary illustration of how the data analysis system 20 finds and characterizes database 34 within an information network 30.

Maintaining the Database Index

Figure 8:
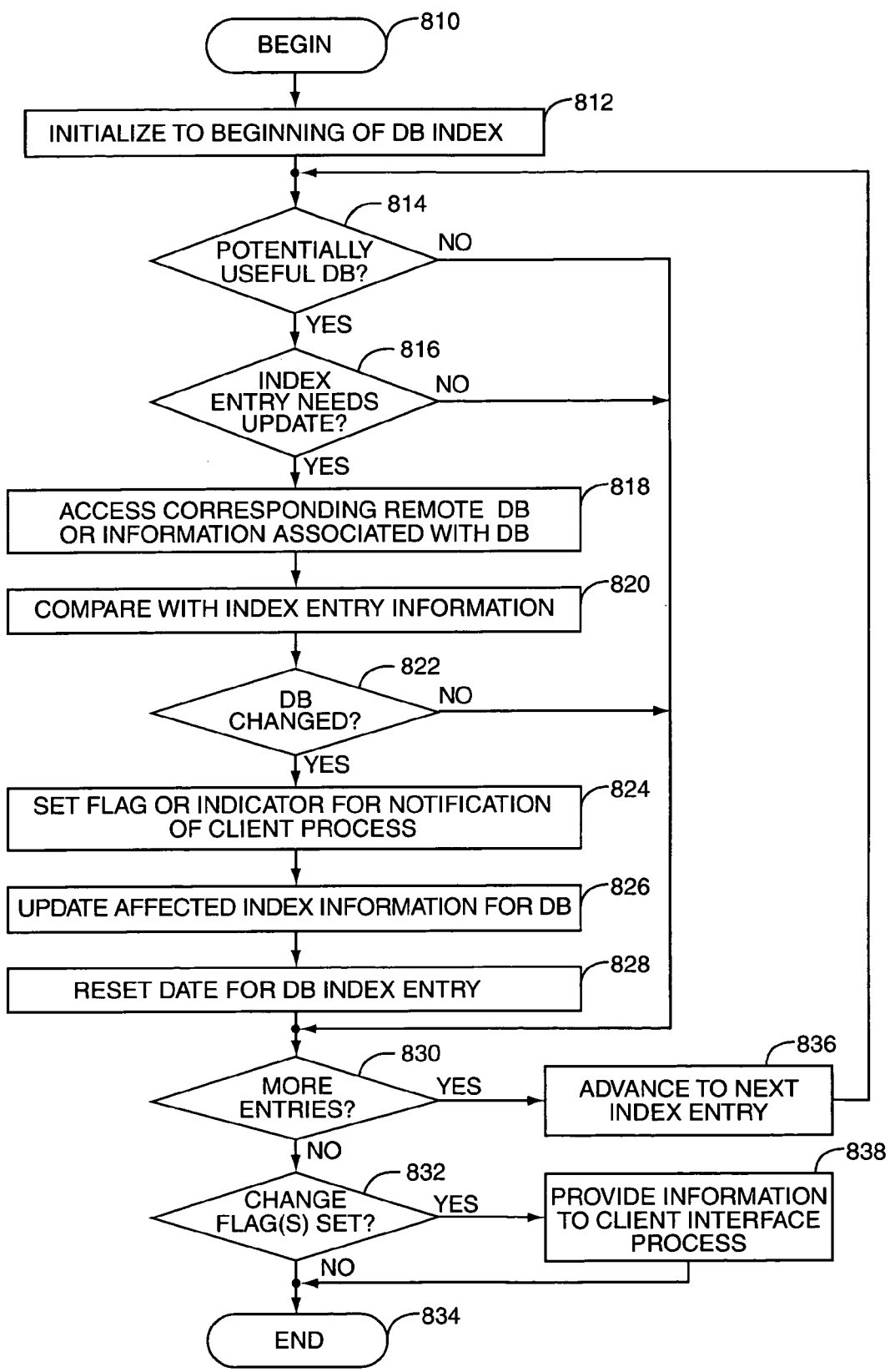
FIG. 8 illustrates simplified flow logic for maintaining the database index of FIG. 4 in some embodiments of the present invention.

Once the data analysis system 20 creates a database index 222, it may be configured to maintain the database index 222 over time. FIG. 8 illustrates an exemplary technique for keeping the database index 222 relatively current with respect to changes in the remote databases 34 corresponding to the entries in the database index 222. Keeping the database index 222 current aids in determining whether any of the remote databases 34 have changed since any previous indexing activity. In turn, this ability to check for changes in one or more of the remote databases 34 allows the data analysis system 20 to be responsive to any such changes. For example, a given database 34 residing within the information network 30 might be used in one or more user analyses. The affected users might naturally want these analyses re-run in response to such changes in the underlying data, or at least might want notification that such data has changed. As with the searching functions discussed above, the following functionality is preferably included within the data collection process 220.

Processing begins (block 810) with the data analysis system 20 accessing the first entry in the database index 222 (block 812). In some embodiments, additional logic may be necessary to select a particular database index 222 if the data analysis system 20 is configured to work with multiple database indexes 222. If the current entry corresponds to a potentially useful database 34 (block 814)—potentially useful database contains data of the desired type—the data analysis system determines whether the current entry requires updating.

This determination may be accomplished in a number of ways. Among the various methods, the data analysis system 20 may look at additional information bearing on the corresponding database 34 that is stored in the database index 222 for the current entry. For example, the data analysis system may determine an appropriate update interval for one or more of the databases 34 that are represented in its database index 222 based on the nature of the data they contain (e.g., daily, monthly, yearly information). As such, the data analysis system 20 can record a date of last indexing for a given entry in the database index 222 and make a determination as to whether the given entry in the database index 222 should be updated. Of course, many other techniques exist for determining when a given entry in the database index 222 should be updated. These additional techniques include setting default update intervals for some or all of the databases 34 represented in the database index 222.

If the current entry tentatively requires updating (block 816), the data analysis system accesses the corresponding remote database 34 (or information associated with the corresponding database 34) via the information network 30 (block 818). This remotely accessed information may be compared to information stored in the database index 222 for the current entry to determine if the remote data has changed (block 820). If the corresponding database 34 has been updated with new data or is otherwise changed (block 822), the data analysis system 20 sets a flag or other indicator that is later used to initiate communication of such change to the user interface process 230 (block 824). The data analysis system 20 then proceeds updating the current entry in the database index 222 to reflect the updates or changes in the corresponding database 34 (block 826). Preferably, the data analysis system 20 stores date information associated with the entries in the database index 222 indicating the last date of updating (or checking) for each entry in the database index 222. If such date information is maintained, the data analysis system 20 updates the updating date for the current entry (block 828). Update date information may be maintained on a per-series basis in the associated data series index 224 as well (not illustrated).

If there are more entries in the database index 222 (block 830), the data analysis system 20 advances to the next entry (block 836) and continues processing subsequent entries as described above (block 814).

If there are no more entries to be processed in the database index 222 (block 830), the data analysis system determines if any updates were made to the database index 222 (block 832). If so, the data analysis system provides information about those changes to the user interface process 230 block 838). Preferably, this involves an exchange of data between the data collection process 220 and the user interface process 230. The user interface process 230 may initiate any number of actions in response to receiving such change information, as will be described later in more detail. After providing change information to the user interface process 230 (block 838), or if no changes were made to the database index 222 (block 832), processing ends (block 834).

As with earlier discussions regarding specific program logic steps and operations, the process of using the database index 222 to check for changes in the associated databases 34 is subject to much variation. As such, the foregoing discussion of operation represents an exemplary implementation and should not be construed as limiting the present invention. Essentially, the data analysis system 20 can use locally stored date information, remotely stored date information, data characteristics (e.g., frequency of data), and other interval timing techniques to determine when to check given ones of the indexed databases 34 for changes. Further, refinements such as checking all databases 34 for changes at a particular computer system 32 if any one of the databases 34 at that computer system 32 needs to be checked, can enhance the efficiency of working through the information network 30. Thus, the above and other variations for determining when and at what frequency various ones of the indexed databases 34 should be checked are considered to be within the scope and spirit of the present invention.

The data collection process 220 imparts significant advantages to the data analysis system 20 by serving as a dynamic conduit between the analytical process 210 and the outside world (the information network 30). Further significant advantages are imparted to the data analysis system 20 by the user interface process 230, which individualizes the behavior and operation of the data analysis system 20 for the users 40. The analytical process 210 provides the processing, analysis, and system modeling operations used to generate meaningful results from the data used by the data analysis system 20.

Preferably, the analytic process is configured to take full advantage of the data collection process 220 and user interface process 230. This means, for example, the analytical process 210 should be responsive to notifications from the data collection process regarding changes in any of the external data used by the analytical process 210. Here, external data refers to data in the databases 34 maintained remotely from the data analysis system 20.

Data Analysis Logic

Figure 9:
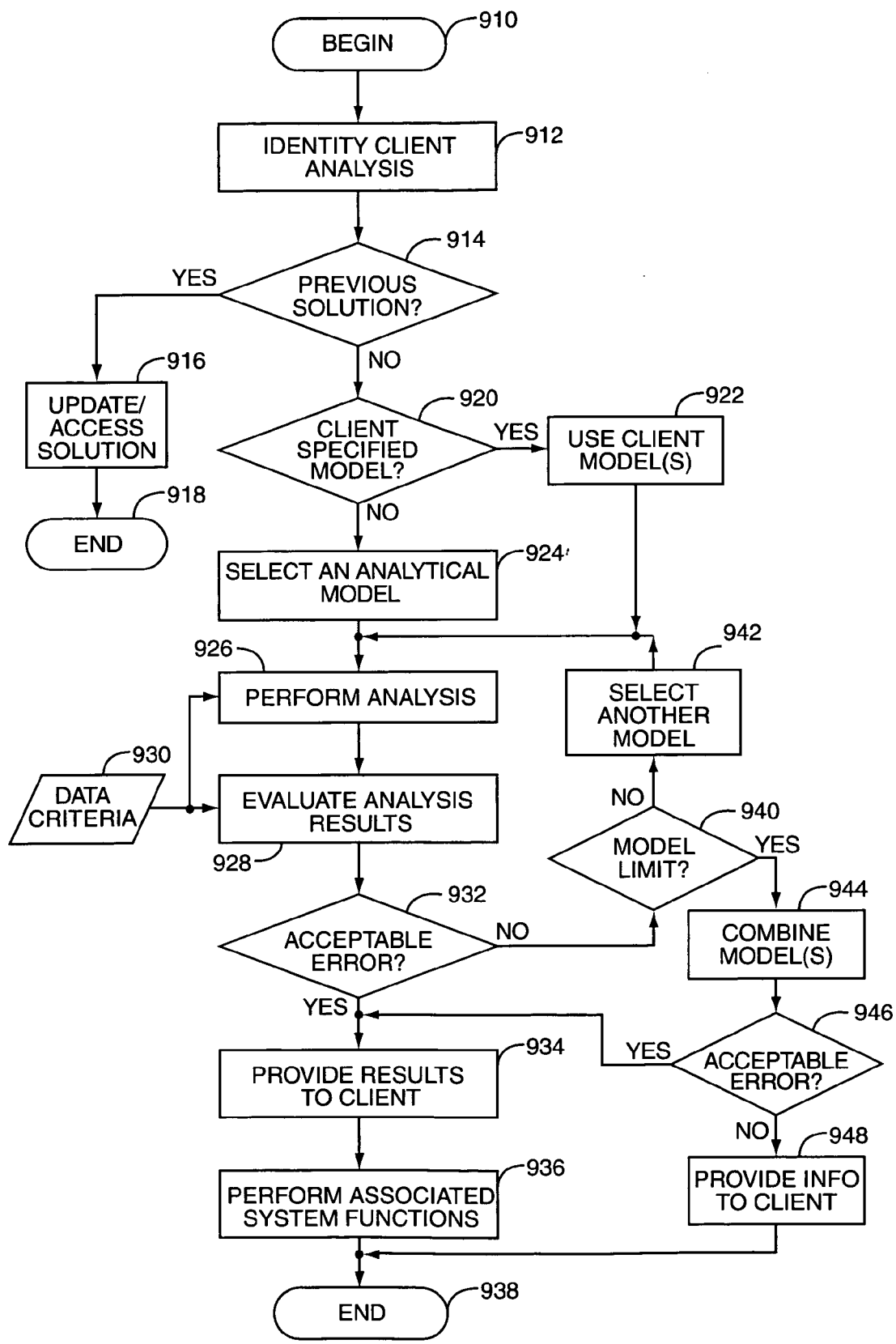
FIG. 9 illustrates simplified flow logic for developing analytical results for a given user problem.

FIG. 9 illustrates an approach to self-directed analysis that may be provided by the data analysis system 20. Earlier, the discussion mentioned the difficulties in determining how to best model a given problem and how to identify data that is truly significant for the given problem. Preferably, the data analysis system 20 maintains an extensible library of models for use in forecasting and analyzing problems. The user interface process 230 can provide users 40 with the ability to select one or more models for application to their desired analyses. Optionally, the data analysis system 20 can automatically select the best-suited model(s), thereby relieving users 40 of labor intensive "what if" guessing and model tweaking. The data analysis system 20 allows its model library to be updated as needed, and further permits users 40 to load analytical models of their choosing into the data analysis system 20 for use in forecasting problems or other analyses.

FIG. 9 illustrates one embodiment of the data analysis system 20 in which analytical models are automatically selected for a given user's problem. Various models are available for forecasting and other statistical analyses. For example, in a forecasting problem based on time series data, a simple linear model for the real-world function might be, $$f(X(t))=a+b_1x_1(t)+b_2x_2(t)+\ldots b_nx_n(t).$$

Where f(X(t)) represents a real-world time series of data being modeled and for which the vector X(t) of other time series of data are found by the analytical process to be leading indicators or predictors of the data series to be forecast; a represents a constant value and $b_i$ represents a numerical coefficient or multiplier for a particular time series, $x_i(t)$. Historical data for these data series related to f(X(t)) is used to determine values for a and $bx_i(t)$ that yield a "best fit" between the calculated f(X(t)) and the historical data for each of the relevant data series $x_i(t)$.

The data analysis system 20 preferably includes quadratic, and exponential models for time series data, as are well understood by those skilled in the art. The data analysis system 20 preferably also includes exponential smoothing models, and multiple regressive techniques, such as auto-regressive moving average (ARMA) modeling.

While the range and sophistication of the analytical models available to the data analysis system 20 affect its ability to provide sophisticated solutions for a variety of problems, the various techniques and models available for advanced statistical processing are well understood by those skilled in the art. For the purposes of discussion, it should be assumed that the analytical process 210 imparts a full suite of statistical and mathematical processing capability to the data analysis system 20.

Thus, FIG. 9 illustrates one embodiment for bringing the considerable analytical resources of the data analysis system 20 to bear on a given problem. Preferably, the analytical process 210 provides the data analysis support implicit in the following discussion of operation logic. In discussing FIG. 9, the terms "analysis" and "current analysis" generically refer to the steps associated with arriving at a solution to the given problem. Because the data analysis system 20 is capable of varying the databases (34 and 212) and the particular analytical models used in the current analysis on an iterative basis, the mathematical operations actually performed by the analytical process 210 may change from iteration to iteration in attempts to reduce analysis error. Those skilled in the art will readily appreciate this when iterative analyses are discussed below.

Processing begins (910) with the data analysis system 20 identifying the desired user analysis or analyses (block 912). This amounts to identifying the problem to be solved or the analysis to be run. A specific analysis may be selected based on information passed from the data collection process 220 (e.g., database change alerts), information passed from the user interface process 230 (e.g., a user request), or on other information received from a user of the data analysis system 20.

If the current analysis represents an update or revision of a prior solution (block 914), the data analysis system 20 updates the previous solution (block 916), performs any ancillary functions arising from the solution update activities, and processing ends (block 918). There are a number of operations the data analysis system 20 may undertake as part of updating a previous solution (block 916), such as notifying the user interface process 230 of such changes in an existing user solution. Further, in updating an existing solution, the data analysis system 20 may use any or all of the adaptive, self-directed modeling selection discussed below in efforts to refine or continually optimize a given user solution.

Thus, if a previous solution does not exist (block 914), or if an existing solution is to be refined or updated, the data analysis system 20 continues processing by determining if a specific model or models have been identified for use in the current analysis (block 920). If the current analysis has been configured to use specific models, the data analysis system 20 selects these models (block 922) and continues processing. If specific models have not been specified for the current analysis (block 920), processing continues with the data analysis system selecting one or more analytical models (block 924). For a first-time analysis, the data analysis system 20 might be configured to select the most simplistic model available in its model library, which may be a simple linear model. Using the selected model, or models, the data analysis system 20 performs the current analysis (block 926) and evaluates the results of the analysis against defined criteria (blocks 928 and 930). Defined criteria may be based on default thresholds for error, or may be specifically configured error comparisons provided by or computed on behalf of the user 40 for whom the current analysis is being performed.

If the analysis yields acceptable errors (block 932), the data analysis system 20 may store the results of the analysis for later communication to the user 40, or may immediately communicate the results to the user 40 (block 934). Depending upon the configuration of the data analysis system 20, there may be other "housekeeping" functions to perform (block 936), such as storing information about the analysis. Such information might include billing data (e.g., system usage, data resources used, analysis time, etc.), or might include storing information and configuring the data analysis system 20 in a way that optimizes it for the user 40. For example, the data analysis system 20 may keep track of how many times a given remote database 34 is used in one or more user analyses, and cause the information in that remote database 34 to be retrieved and placed into local storage for more efficient subsequent accesses—not illustrated.

Of course, the data analysis system 20 can further include logic for insuring that updates made to the corresponding remote database 34 are maintained in such a "localized" version of the data. The analytical process 210 might also, during its analytical processing (blocks 924-946), work to identify which data (possibly from both local databases to 12 and remote databases 34) are the most statistically significant in the current analysis. This information could be provided to the user interface process 230, which would store it on a user-specific basis.

With such information, the data analysis system 20 can tailor the various user alerts in warnings that it provides to the users 40 such that nuisance alerts are avoided by alerting users 40 only when data that is statistically significant to them changes. Identifying statistically significant databases 34 (and 212) also allows the data analysis system 20 to avoid unnecessary analysis updates by updating user analyses only when data that is known to be statistically significant to those analyses changes. Thus, the data collection process 220 might detect a change in a given one of the remote databases 34 and communicate this information to the user interface process 230, which could then check to see if the changed data is statistically significant for one or more users 40.

The above discussion assumes that the data analysis system 20 arrived at an acceptable solution for the current analysis. If the current analysis has not met error limit requirements (block 932), the data analysis system 20 determines if there are untried additional models available in its model library (block 940). If so, the data analysis system 20 selects one or more untried analytical models (block 942) and re-runs the appropriate analysis (block 926). If no untried models remain (block 940), the data analysis system 20 may process or combine the results obtained from one or more of the models tried in order to reduce the results error (block 944). If the analysis solution arising from the combined results is within error limits (block 946), processing continues with the results being communicated to the user 40 for whom the analysis is being performed, or stored for later communication to the user 40 (block 934). If an acceptable solution can not be achieved in the current analysis (block 946), the data analysis system 20 may provide relevant information and the best results available to the user 40, or store such information for later communication to the user 40 (block 948).

While not explicitly illustrated in FIG. 9 for the sake of operational clarity, some embodiments of the data analysis system 20 include more complex methods for minimizing the error in an analysis. As illustrated, the data analysis system 20 can choose different analytical models (block 942), or combine analysis results from multiple models (block 944), in its efforts to provide users 40 with the most accurate results (e.g., forecast). Further, the data analysis system 20 may run analytical iterations trying various combinations of data from various sources (e.g., databases 34). This is consistent with the ability of the data analysis system 20 to recognize data that is statistically significant in a given analysis. Thus, the data analysis system 20 might control the data collection process 220 and analytical process 210 such that they cooperate to re-run a given analysis with different data sources attempting to identify the specific data that is most significant to the given problem. That data may come from any combination of local and remote data sources (i.e., local databases 212 and remote databases 34).

As with any complex system, the present invention is subject to significant variation in terms of structure, implementation, and operation. The foregoing discussion and supporting illustrations presented exemplary details for understanding the present invention, but should not be construed as limiting. For example, the data analysis system 20 might be hosted on a variety of computer system architectures. One or more computer systems, possibly different types, may be associated together and each implement selected portions of the data analysis system 20. Alternatively, the data analysis system 20 may be entirely contained within a single computer system, or made a functional part of a larger computer system. Additional flexibility derives from the ability to implement reduced functional groupings of the data analysis system 20. For example, some instances of the data analysis system 20 may combine the analytical process 210 with the data collection process 220, or may combine the analytical process 210 with just the user interface process 230.

Further, the various ways of inputting information into and outputting information from the data analysis system 20, whether for configuration or operational control, is not critical to practicing the present invention. For example, the host platform 20A may include a common network interface that is used for exchanging user information as well as local system access by, for example, system administrators. Of course, the data analysis system 20 may be designed with varying levels of access permission such that a common system interface provides varying levels of functionality to different users (e.g., administrators, users, etc.). In this manner, a common interface with the data analysis system 20 can provide different feature sets and different levels of access. This is useful, as those skilled in the art will readily appreciate, because a system administrator may need access to all user configuration information, while individual users 40 would likely be restricted from viewing anything not related to their use of the data analysis system 20.

Various embodiments of the data analysis system 20 have been disclosed as having a full complement of statistical processing and economic forecasting (e.g., macro-economic forecasting) capability, with such capability being well understood in the art. However, the particular capabilities for the data analysis system 20 may be varied in concert with the particular needs arising in a specific installation or use. Thus, the present invention is not limited to a specific functional organization of software, or to the specific realization of supporting computer architecture. Neither the foregoing discussion nor the supporting illustrations should be interpreted as limiting the scope of the present invention. Indeed, the present invention is limited only by the scope of the following claims, and by the reasonable equivalents thereof.

What is claimed is:

1. A computer-implemented method of locating one or more remote databases containing a desired type of data, comprising:

searching for at least one remote database accessible via a network of computer systems;

determining whether each remote database found during the searching is comprised of the desired type of data, wherein the desired type of data is time series data;

storing location information for each remote database found during the searching if the remote database is comprised of the desired type of data;

determining whether a correlation exists between at least some of the data of the desired type contained in the at least one remote database and at least some of the data of the desired type contained in a predefined data set; and if the correlation exists storing an indication of the correlation in association with the stored location information for the at least one remote database.

2. The method of claim 1, further comprising:

selecting at least one remote database found during searching that is comprised of the desired type of data for use in a predetermined data analysis;

retrieving data from the selected remote database via the network of computer systems; and using the data retrieved from the selected remote database in the predetermined data analysis.

3. The method of claim 2, further comprising for at least one remote database found during the searching that is comprised of the desired type of data:

storing an indication that the remote database is comprised of data that has been used in the predetermined data analysis.

4. The method of claim 3, further comprising for at least one remote database that is comprised of data that has been used in the predetermined data analysis:

determining at a predetermined time interval whether the database has changed; and if the database has changed, updating the predetermined data analysis using the changed data.

5. The method of claim 4, wherein the predetermined time interval is determined on the basis of the frequency of the time series data.

6. The method of claim 4, further comprising for the at least one predetermined data analysis that has been updated:

providing an indication to a predetermined user that the predetermined data analysis has been updated.

7. The method of claim 4, further comprising for the at least one predetermined data analysis that has been updated:

providing the updated predetermined data analysis to a predetermined user.

8. The method of claim 2, wherein the predetermined data analysis is a forecast.

9. The method of claim 8, wherein the forecast is an economic, demographic or meteorological forecast.

10. The method of claim 2, wherein the predetermined data analysis is specified by a user.

11. The method of claim 2, further comprising:

selecting at least one local database specified by a user, wherein the local database is comprised of the desired type of data for use in a predetermined data analysis;

retrieving data from the selected local database via the network of computer systems; and using the data retrieved from the selected local database in the predetermined data analysis.

12. The method of claim 1, further comprising:

storing information about the number of times that a remote database containing the desired type of data is used in at least one predetermined data analysis; and if the number times the remote database is used in the predetermined data analysis exceeds a predefined value, storing locally the data used in the predetermined analysis.

13. The method of claim 1, further comprising:
receiving a specification of the desired type of data before the searching and the storing.

14. The method of claim 1, further comprising:
determining the type of data relevant to a predetermined analysis before the searching and the storing.

15. The method of claim 1, further comprising for each remote database found during the searching that is comprised of the desired type of data:
determining information about at least one characteristic of the remote database; and
storing the information about the at least one characteristic of the remote database in association with the location information for the remote database.

16. The method of claim 15, wherein the information about the at least one characteristic of the remote database is selected from the group consisting of data frequency, data units, data scale, data source, data update date, and number of data points.

17. The method of claim 16, wherein data frequency value is determined by calculating a time interval between individual data values of the desired type that are contained in the remote database.

18. The method of claim 15, wherein the at least one characteristic of the remote database is determined from at least one XML data definition tag that is associated with the remote database.

19. The method of claim 15, further comprising:
receiving from a user a specification of a desired remote database characteristic;
searching the stored remote database characteristic information; and
identifying one or more remote databases having the desired remote database characteristic.

20. The method of claim 19, further comprising:
providing information to the user identifying the one or more remote databases having the desired remote database characteristic.

21. The method of claim 1, wherein the searching for remote databases accessible via the network of computer systems comprises:
reading network address information for at least one computer system within the network of computer systems;
accessing the at least one computer system based on the network address information; and
retrieving information from the at least one computer system sufficient to determine whether the at least one computer system provides access to at least one remote database.

22. The method of claim 21, further comprising using predefined communications protocol to access the at least one computer system and to process the information retrieved from the at least one computer system.

23. The method of claim 22, wherein the predefined communications protocol is TCP/IP.

24. The method of claim 21, further comprising using predefined database formatting information to access the at least one computer system and to process the information retrieved from the at least one computer system.

25. The method of claim 24, wherein the predefined database formatting information is comprised of a plurality of predefined database format definitions.

26. The method of claim 1, wherein the searching for remote databases within the network of computer systems further comprises:
reading uniform resource locator (URL) information corresponding to at least one computer system accessible via the Internet;
accessing the at least one computer system via the Internet;
determining whether the at least one computer system provides access to at least one remote database; and
storing location information for the at least one computer system if the at least one computer system provides access to the at least one remote database.

27. The method of claim 1, wherein the determining whether the at least one remote database is comprised of data of a desired type is further comprised of:
retrieving HTML formatted information from each computer system found that provides access to at least one remote database; and
parsing the retrieved HTML formatted information to determine whether the at least one remote database is comprised of data of the desired type.

28. The method of claim 27, wherein the HTML formatted information is comprised of a meta tag.

29. The method of claim 1, wherein the determining whether the at least one remote database is comprised of data of the desired type is further comprised of:
retrieving XML formatted information from each computer system that provides access to at least one remote database; and
parsing the retrieved XML formatted information to determine whether the at least one remote database is comprised of data of the desired type.

30. The method of claim 1, further comprising for each remote database found during the searching that is comprised of the desired type of data:
storing an indication of whether the remote database is comprised of time series data in association with the location information for the remote database.

31. The method of claim 30, further comprising:
for each of the time series of data, identifying at least one characteristic of the time series of data; and
storing characteristic information for each time series of data in association with the location information for the remote database in which the time series of data is contained.

32. The method of claim 31, wherein the characteristic information is comprised of:
a number of data points in the at least one time series of data.

33. The method of claim 31, wherein the characteristic information is comprised of:
a starting time of the time series of data;
an ending time of the time series of data; and
a time interval between each of the data points contained in the time series of data.

34. The method of claim 31, wherein the characteristic information is comprised of:
data series format information, wherein the data series format information is comprised of information about the format of the time series of data contained in the at least one database.

35. The method of claim 30, further comprising:
for each of the time series of data, determining whether the time series of data is redundant of a data series for which information has already been stored.

36. The method of claim 35, further comprising:
if the time series of data is redundant of the data series for which information has already been stored, not storing information about the time series of data.

37. The method of claim 35, further comprising:
if the time series of data is not redundant of the data series for which information has already been stored, storing information about the time series of data.

38. The method of claim 1, wherein the predefined data set is comprised of economic data.

39. The method of claim 38, wherein the economic data is microeconomic data.

40. The method of claim 38, wherein the economic data is macroeconomic data.

41. The method of claim 1, wherein the predefined data set is comprised of demographic data.

42. The method of claim 1, wherein the predefined data set is comprised of meteorological data.

43. The method of claim 1, further comprising for at least one remote database found during the searching:
determining a volatility measurement for at least some of the data of the desired type contained in the at least one remote database; and
storing the volatility measurement in association with the stored location information for the at least one remote database.

44. The method of claim 1, further comprising for at least one remote database found during the searching:
determining a seasonality measurement for at least some of the data of the desired type contained in the at least one remote database; and
storing the seasonality measurement in association with the stored location information for the at least one remote database.

45. A memory for storing information relating to at least one remote database accessible via a network of computer systems, the at least one remote database being comprised of a desired type of data, the memory comprising a data structure, the data structure comprising:
a database key, wherein the database key uniquely identifies the at least one remote database;
location information for the at least one remote database, the location information being stored if the at least one remote database is comprised of the desired type of data, wherein the desired type of data is time series data, and the location information being stored in association with the database key;
a data series key for the time series of data, wherein the data series key uniquely identifies the time series of data; and
location information for the time series of data, the location information being stored in association with the data series key.

46. The memory of claim 45, wherein the location information for the at least one remote database is stored regardless of whether the remote database is comprised of the desired type of data, and the data structure further comprising:
data type information, wherein the data type information indicates the type of data contained in the at least one remote database, the data type information being stored in association with the database key.

47. The memory of claim 46, wherein the data type information indicates whether the at least one remote database is comprised of the desired type of data.

48. The memory of claim 45, the data structure further comprising:
database descriptive information about the at least one remote database, the database descriptive information being stored in association with the database key.

49. The memory of claim 45, the data structure further comprising:
database usage information, wherein the database usage information indicates that the at least one remote database is comprised of data that has been used in the predetermined data analysis, the database usage information being stored in association with the database key.

50. The memory of claim 45, the data structure further comprising:
database update information, wherein the database update information is comprised of information about when the at least one remote database was last updated, the database update information being stored in association with the database key.

51. The memory of claim 45, the data structure further comprising:
data series descriptive information about the at least one data series, the data series descriptive information being stored in association with the data series key.

52. The memory of claim 45, the data structure further comprising:
a number of data points in the time series of data, the number of data points being stored in association with the data series key.

53. The memory of claim 45, the data structure further comprising:
a starting time of the time series of data, the starting time being stored in association with the data series key;
an ending time of the time series of data, the ending time being stored in association with the data series key; and
a time interval between each of the data points contained in the time series of data, the time interval being stored in association with the data series key.

54. The memory of claim 45, the data structure further comprising:
data series usage information, wherein the data series usage information indicates that the time series of data is comprised of data that has been used in the predetermined data analysis, the data series usage information being stored in association with the data series key.

55. The memory of claim 45, the data structure further comprising:
data series update information, wherein the data series update information is comprised of information about when the time series of data was last updated, the data series update information being stored in association with the data series key.

56. The memory of claim 45, the data structure further comprising:
data series format information, wherein the data series format information is comprised of information about the format of the time series of data contained in the at least one remote database, and the data series format information being stored in association with the data series key.

57. The memory of claim 45, the data structure further comprising:
database subscription information, wherein the database subscription information is comprised of information about whether payment is required to access the data contained in the at least one remote database.

58. The memory of claim 45, the data structure further comprising:
   database access authorization information, wherein the database access authorization information is comprised of information necessary to access the data contained in the at least one remote database.

59. The memory of claim 58, wherein the database access authorization information is comprised of user identification information and a password.

60. A computerized apparatus for locating one or more remote databases containing a desired type of data, comprising:
   a computer that searches for at least one remote database, the at least one database being accessible by the computer via a network of computer systems, and that determines whether each remote database found during the searching is comprised of the desired type of data, wherein the desired type of data is time series data;
   a computer memory that stores location information for each remote database found during searching, the location information being stored in the computer memory if the remote database is comprised of time series data;
   wherein the computer determines whether a correlation exists between at least some of the data of the desired type contained in the at least one remote database and at least some of the data of the desired type contained in a predefined data set; and
   if the correlation exists, an indication of the correlation is stored in the computer memory in association with the stored location information for the at least one remote database.

61. The computerized apparatus of claim 60, wherein the computer:
   selects at least one remote database found during searching that is comprised of the desired type of data for use in a predetermined data analysis;
   retrieves data from the selected remote database via the network of computer systems; and
   uses the data retrieved from the selected remote database in the predetermined data analysis.

62. The computerized apparatus of claim 61, wherein, for at least one remote database found during the searching that is comprised of the desired type of data, an indication that the remote database is comprised of data that has been used in the predetermined data analysis is stored in the computer memory.

63. The computerized apparatus of claim 62, wherein, for at least one remote database that is comprised of data that has been used in the predetermined data analysis, the computer determines at a predetermined time interval whether the database has changed; and
   if the database has changed, the computer updates the predetermined data analysis using the changed data.

64. The computerized apparatus of claim 63, wherein, for at least one remote database that is comprised of data that has been used in the predetermined data analysis, the computer determines the predetermined time interval on the basis of the frequency of the time series data.

65. The computerized apparatus of claim 63, wherein, for the at least one predetermined data analysis that has been updated, the computer provides an indication to a predetermined user that the predetermined data analysis has been updated.

66. The computerized apparatus of claim 63, wherein, for the least one predetermined data analysis that has been updated, the computer provides the updated predetermined data analysis to a predetermined user.

67. The computerized apparatus of claim 61, wherein the predetermined data analysis is a forecast.

68. The computerized apparatus of claim 67, wherein the forecast is an economic, demographic or meteorological forecast.

69. The computerized apparatus of claim 61, wherein the predetermined data analysis is specified by a user.

70. The computerized apparatus of claim 61, wherein the computer:
   selects at least one local database specified by a user, wherein the local database is comprised of the desired type of data for use in a predetermined data analysis;
   retrieves data from the selected local database via the network of computer systems; and
   uses the data retrieved from the selected local database in the predetermined data analysis.

71. The computerized apparatus of claim 60, wherein:
   information about the number of times that a remote database containing the desired type of data is used in at least one predetermined data analysis is stored in the computer memory; and
   if the number times the remote database is used in the predetermined data analysis exceeds a predefined value, the data used in the predetermined analysis is stored in the computer memory.

72. The computerized apparatus of claim 60, wherein:
   a specification of the desired type of data before the searching and the storing is received by the computer.

73. The computerized apparatus of claim 60, wherein:
   the type of data relevant to a predetermined analysis is determined before the searching and the storing.

74. The computerized apparatus of claim 60, wherein, for each remote database found during the searching that is comprised of the desired type of data:
   the computer determines information about at least one characteristic of the remote database; and
   the information about the at least one characteristic of the remote database is stored in the computer memory in association with the location information for the remote database.

75. The computerized apparatus of claim 74, wherein the information about the at least one characteristic of the remote database is selected from the group consisting of data frequency, data units, data scale, data source, data update date, and number of data points.

76. The computerized apparatus of claim 75, wherein data frequency value is determined by calculating a time interval between individual data values of the desired type that are contained in the remote database.

77. The computerized apparatus of claim 74, wherein the computer determines the at least one characteristic of the remote database from at least one XML data definition tag that is associated with the remote database.

78. The computerized apparatus of claim 74, wherein the computer:
   receives from a user a specification of a desired remote database characteristic;
   searches the stored remote database characteristic information; and
   identifies one or more remote databases having the desired remote database characteristic.

79. The computerized apparatus of claim 78, wherein the computer:
   provides information to the user identifying the one or more remote databases having the desired remote database characteristic.

80. The computerized apparatus of claim 60, wherein the computer, in searching for remote databases accessible via the network of computer systems:
   reads network address information for at least one computer system within the network of computer systems;
   accesses the at least one computer system based on the network address information; and
   retrieves information from the at least one computer system sufficient to determine whether the at least one computer system provides access to at least one remote database.

81. The computerized apparatus of claim 80, wherein the computer uses predefined communications protocol to access the at least one computer system and to process the information retrieved from the at least one computer system.

82. The computerized apparatus of claim 81, wherein the predefined communications protocol is TCP/IP.

83. The computerized apparatus of claim 80, wherein the computer uses predefined database formatting information to access the at least one computer system and to process the information retrieved from the at least one computer system.

84. The computerized apparatus of claim 83, wherein the predefined database formatting information is comprised of a plurality of predefined database format definitions.

85. The computerized apparatus of claim 60, wherein the computer, in searching for remote databases within the network of computer systems:
   reads uniform resource locator (URL) information corresponding to at least one computer system accessible via the Internet;
   accesses the at least one computer system via the Internet;
   determines whether the at least one computer system provides access to at least one remote database; and
   stores location information for the at least one computer system in the computer memory if the at least one computer system provides access to the at least one remote database.

86. The computerized apparatus of claim 60, wherein the computer, in determining whether the at least one remote database is comprised of data of a desired type:
   retrieves HTML formatted information from each computer system found that provides access to at least one remote database; and
   parses the retrieved HTML formatted information to determine whether the at least one remote database is comprised of data of the desired type.

87. The computerized apparatus of claim 86, wherein the HTML formatted information is comprised of a meta tag.

88. The computerized apparatus of claim 60, wherein the computer, in determining whether the at least one remote database is comprised of data of the desired type:
   retrieves XML formatted information from each computer system that provides access to at least one remote database; and
   parses the retrieved XML formatted information to determine whether the at least one remote database is comprised of data of the desired type.

89. The computerized apparatus of claim 60, wherein, for each remote database found during the searching that is comprised of the desired type of data, the computer:
   stores in the computer memory an indication of whether the remote database is comprised of time series data in association with the location information for the remote database.

90. The computerized apparatus of claim 89, wherein the computer, for each of the time series of data:
   identifies at least one characteristic of the time series of data; and
   stores in the computer memory characteristic information for each time series of data in association with the location information for the remote database in which the time series of data is contained.

91. The computerized apparatus of claim 90, wherein the characteristic information is comprised of:
   a number of data points in the at least one time series of data.

92. The computerized apparatus of claim 90, wherein the characteristic information is comprised of:
   a starting time of the time series of data;
   an ending time of the time series of data; and
   a time interval between each of the data points contained in the time series of data.

93. The computerized apparatus of claim 90, wherein the characteristic information is comprised of:
   data series format information, wherein the data series format information is comprised of information about the format of the time series of data contained in the at least one database.

94. The computerized apparatus of claim 89, wherein the computer, for each of the time series of data, determines whether the time series of data is redundant of a data series for which information has already been stored.

95. The computerized apparatus of claim 94, wherein, if the time series of data is redundant of the data series for which information has already been stored, the computer does not store information about the time series of data.

96. The computerized apparatus of claim 94, wherein, if the time series of data is not redundant of the data series for which information has already been stored, the computer stores in the computer memory information about the time series of data.

97. The computerized apparatus of claim 60, wherein the predefined data set is comprised of economic data.

98. The computerized apparatus of claim 97, wherein the economic data is microeconomic data.

99. The computerized apparatus of claim 97, wherein the economic data is macroeconomic data.

100. The computerized apparatus of claim 60, wherein the predefined data set is comprised of demographic data.

101. The computerized apparatus claim 60, wherein the predefined data set is comprised of meteorological data.

102. The computerized apparatus of claim 60, wherein the computer, for at least one remote database found during the searching:
   determines a volatility measurement for at least some of the data of the desired type contained in the at least one remote database; and
   stores the volatility measurement in the computer memory in association with the stored location information for the at least one remote database.

103. The computerized apparatus of claim 60, wherein the computer, for at least one remote database found during the searching:
   determines a seasonality measurement for at least some of the data of the desired type contained in the at least one remote database; and
   stores the seasonality measurement in the computer memory in association with the stored location information for the at least one remote database.

* * * * *